United States Patent

Uchida et al.

[11] Patent Number: 6,160,904
[45] Date of Patent: Dec. 12, 2000

[54] APPARATUS FOR INPUTTING INFORMATION ON THE IRREGULARITY OF A FINGER, INDIVIDUAL-IDENTIFYING APPARATUS AND IDENTIFYING METHOD

[75] Inventors: Satoshi Uchida, Yokohama; Kenichi Ide, Tokyo; Takafumi Ito, Tokyo; Motoshi Kurihara, Tokyo, all of Japan

[73] Assignee: Kabushiki Kaisha Toshiba, Kawasaki, Japan

[21] Appl. No.: 09/044,829

[22] Filed: Mar. 20, 1998

[30] Foreign Application Priority Data

| Mar. 21, 1997 | [JP] | Japan | 9-068550 |
| Sep. 22, 1997 | [JP] | Japan | 9-257349 |
| Sep. 22, 1997 | [JP] | Japan | 9-275119 |

[51] Int. Cl.$^7$ .................................................. G06K 9/00
[52] U.S. Cl. ........................................ 382/124; 340/825.34
[58] Field of Search ............................. 382/124, 126, 382/116; 340/825.31, 825.34

[56] References Cited

U.S. PATENT DOCUMENTS

| 5,054,089 | 10/1991 | Uchida | 382/4 |
| 5,673,041 | 9/1997 | Chatigny et al. | 341/22 |
| 5,757,278 | 5/1998 | Itsumi | 340/825.31 |
| 5,963,679 | 9/1999 | Setlak | 382/124 |

FOREIGN PATENT DOCUMENTS

| 791 899 A2 | 8/1997 | European Pat. Off. . |
| 7-168930 | 7/1995 | Japan . |

OTHER PUBLICATIONS

Patent Abstracts of Japan, Shunji, "Surfacwe Shape Sensor, and Individual Verification Device and Started–Type System Using the Same", Jul. 1995.

Piquet, et al., "Entree de Donnees Pour Montre Multifonctionnelle", Regulation, Sep. 1977, pp. 69–73.

Young, et al., "Novel Fingerprint Scanning Arrays using Polysilicon TFT's on Glass and Polymer Substrates", IEEE Electron Device Letters, vol. 18, No. 1, Jan. 1997, pp. 19–20.

*Primary Examiner*—Bhavesh Mehta
*Attorney, Agent, or Firm*—Pillsbury Madison & Sutro LLP

[57] ABSTRACT

This invention relates to an individual-identifying apparatus in which a plurality of output electrodes are arranged at regular intervals in a direction perpendicular to a longitudinal direction of a finger, a single input electrode is arranged at an end along the direction in which the output electrodes are arranged, the output of an oscillator which outputs a signal of a predetermined frequency is sequentially supplied to the output electrodes via an analog switch group, an electric signal output from the input electrode is detected by a phase detecting circuit, and the output of the circuit is converted to a digital signal by an A/D converter, thereby detecting the irregularity pattern of the finger to identify an individual. This individual-identifying apparatus can perform stable individual identification which is not easily influenced by the surface state of the finger, for example, whether or not it is damp, or by outside noise.

10 Claims, 24 Drawing Sheets

APPARATUS FOR INPUTTING INFORMATION ON THE IRREGULARITY OF A FINGER, INDIVIDUAL-IDENTIFYING APPARATUS AND IDENTIFYING METHOD

BACKGROUND OF THE INVENTION

This invention relates to a finger irregularity information input apparatus for inputting irregularity information as information indicative of features of an individual finger, and an individual-identifying apparatus for identifying an individual, using the finger irregularity information input apparatus.

Recently, much attention has been paid to individual-identifying apparatuses for identifying whether or not to-be-identified persons are registered ones. These apparatuses are used for the purpose of, for example, managing members who enter or leave important institutions.

Identification of individuals can be performed by various methods. One is to identify individuals from the pattern of the overall finger. For example, Japanese Patent Application KOKAI Publication No. 2-178777 discloses a method for optically picking up an image of the overall finger, and using, as finger characterizing information, an addition signal obtained by adding pixel values of the image in a direction perpendicular to the longitudinal direction of the finger to thereby perform identification. This method, however, requires an optical system, which limits a reduction in the size of the identifying apparatus.

To solve such the limit, Japanese Patent Application KOKAI Publication No. 7-168930, for example, proposes a method for using, instead of an optical system, a linear electrode array which comprises a plurality of linear electrodes extending at regular intervals in a direction perpendicular to the longitudinal direction of a to-be-identified finger. In this method, resistance values between adjacent linear electrodes obtained while the finger presses the linear electrode array are sequentially read and synthesized into a signal, which is used as information indicative of features of the finger.

However, in the individual-identifying apparatus disclosed in Japanese Patent Application KOKAI Publication No. 7-168930, identification information on finger features is extracted by measuring the surface electric resistance (DC impedance) of a finger. Therefore, the information is influenced by the surface state of the finger, for example, whether or not the finger is moist. This means that the individual identifying performance of the apparatus may well degrade depending upon the finger surface state.

BRIEF SUMMARY OF THE INVENTION

It is the object of the invention to provide a finger irregularity information input apparatus and an individual-identifying apparatus, which are not greatly influenced by a change in the surface state of a to-be-identified finger, and hence can show a high individual- identifying performance.

According to a first aspect of the invention, there is provided a finger irregularity information input apparatus comprising:

a plurality of output electrodes arranged at regular intervals in a direction perpendicular to a longitudinal direction of a to-be-measured finger of a to-be-identified person, the finger having its irregularity measured, the output electrodes being brought into contact with the finger;

an oscillator for outputting a signal of a predetermined frequency to each of the output electrodes;

a switching unit for sequentially connecting the output terminal of the oscillator to the output electrodes;

an input electrode extending at an end along the direction in which the output electrodes are arranged, the input electrode being brought into contact with the finger; and a detecting device for detecting a capacitive coupling signal generate between the finger and the input electrode.

According to a second aspect of the invention, there is provided the input electrode is not aligned with the output electrodes, so that a finger different from the to-be-measured finger or another portion of a body of the to-be-identified person can be brought into contact with the input electrode.

According to a third aspect of the invention, there is provided the oscillator supplies an output to one of the output electrodes, the switching unit grounds those of the output electrodes which are adjacent to the output electrode to be connected to the oscillator.

According to a fourth aspect of the invention, there is provided a finger irregularity information input apparatus comprising:

an output electrode to be brought into contact with a voluntary portion of a to-be-measured finger of a to-be-identified person;

an oscillator for outputting a signal of a predetermined frequency to the output electrode;

a plurality of input electrodes arranged at regular intervals in a direction perpendicular to a longitudinal direction of the finger, the input electrodes being brought into contact with the finger at the same time when the finger is put into contact with the output electrode;

a switching unit for enabling the input electrodes to sequentially inputting current induced through the finger to which the signal is applied from the output electrode; and a detecting device for detecting a capacitive coupling signal generate between the finger and the input electrode taken via the switching unit from each of the input electrodes, to thereby generate a predetermined output signal.

According to a fifth aspect of the invention, there is provided the insulator provided on at least one of the output electrodes and the input electrode.

According to a sixth aspect of the invention, there is provided an individual-identifying apparatus comprising:

a storage device for storing feature information for identification concerning a to-be-measured finger of a to-be-identified person;

a finger irregularity information input apparatus including: a plurality of output electrodes arranged at regular intervals in a direction perpendicular to a longitudinal direction of a to-be-measured finger of a to-be-identified person, the finger having its irregularity measured, the output electrodes being brought into contact with the finger; an oscillator for outputting a signal of a predetermined frequency to each of the output electrodes; a switching unit for sequentially connecting the output terminal of the oscillator to the output electrodes; an input electrode extending at an end along the direction in which the output electrodes are arranged, the input electrode being brought into contact with the finger; and a detecting device for detecting a capacitive coupling signal generate between the finger and the input electrode; and a comparing device for comparing feature information obtained from the phase detecting device of the finger irregularity input apparatus, with the feature information stored in the storage device, in order to identify the to-be-identified person.

According to a seventh aspect of the invention, there is provided an apparatus for measuring a capacitive impedance between two points, comprising:

a plurality of linear electrodes arranged at regular intervals in a direction perpendicular to a longitudinal direction of a to-be-measured object;

a power supply device for applying a voltage of a voluntary frequency to each of the linear electrodes, the power supply device being connected to the linear electrodes such that it can apply the voltage to a voluntary one of the linear electrodes;

a switching unit for sequentially applying the voltage from the power supply device to the linear electrodes;

a detection electrode for detecting the level of current induced through the to-be-measured object to which the voltage is sequentially applied via the linear electrodes using the switching unit; and an output device for outputting a capacitive impedance pattern of the to-be-measured object on the basis of the current level detected by the detection electrode and the distance between the detection electrode and each of the linear electrodes.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The embodiments of the invention will be described with reference to the accompanying drawings.

Figure 1:
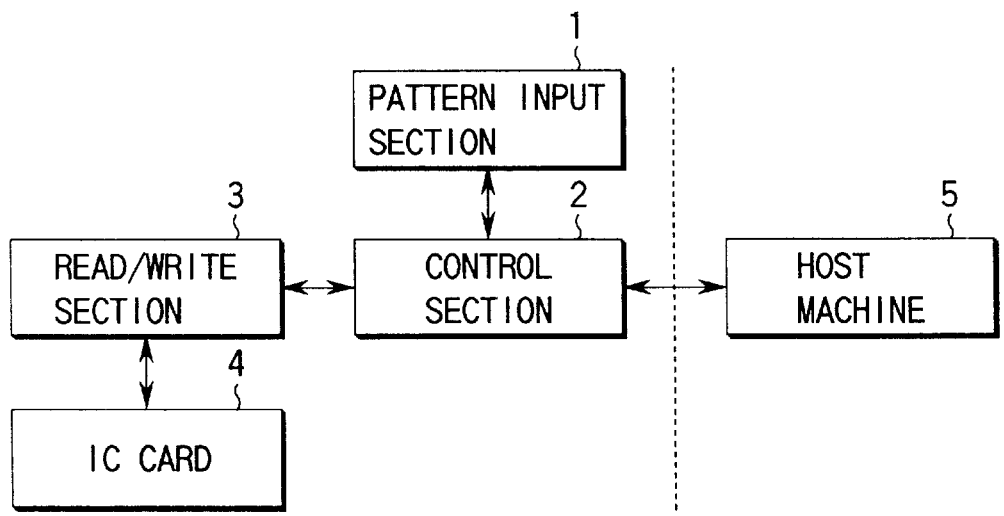
FIG. 1 is a schematic block diagram, showing the structure of an individual-identifying apparatus according to a first embodiment of the invention.

FIG. 1 is a schematic view, showing a structure of an individual-identifying apparatus according to a first embodiment of the invention.

As is shown in FIG. 1, the individual-identifying apparatus includes a pattern input section 1 for picking up a one-dimensional pattern, i.e. a projection signal V (i), of the overall surface of a finger of a to-be-identified person created on the basis of differences in distance between portions of the finger and the output electrode of the input section (which will be described later); a control section 2 for performing an identification process such as registration or identification of the pattern input through the input section 1, or controlling the overall apparatus; and a read/write section 3 for writing (for registration), into an IC card 4 as storage means, the projection signal or feature information for identification indicative of the finger, and for reading the feature information for identification from the IC card 4.

A host machine 5 is responsive to a control signal from the control section 2 for controlling, for example, the opening/closing of the door of an important institution, or the alarming operation of an alarm buzzer. The host machine 5 controls different objects between security systems to which the individual-identifying apparatus is applied.

Figure 2:
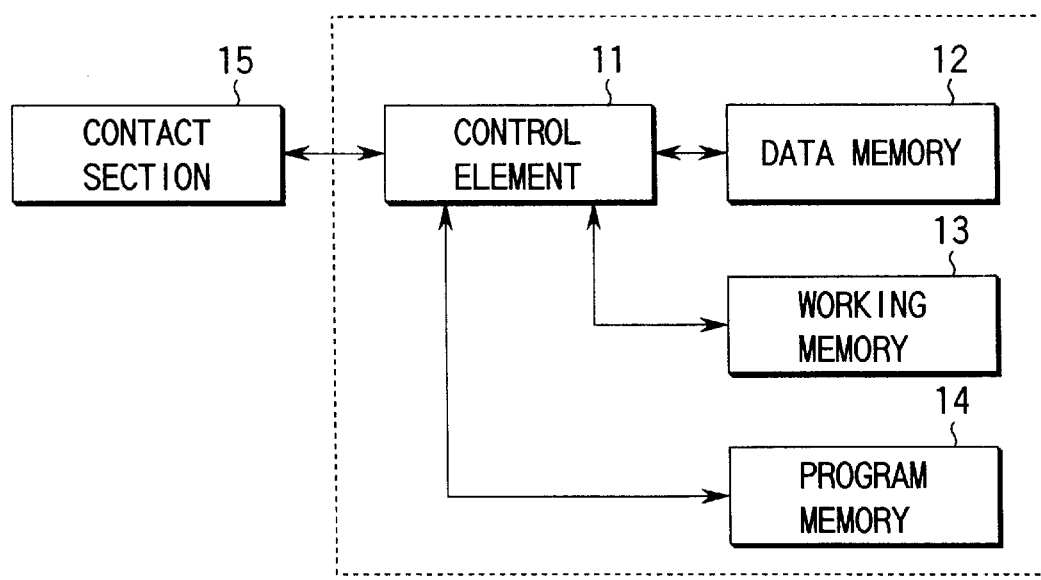
FIG. 2 is a block diagram, showing a structure of an IC card for use in the individual-identifying apparatus of FIG. 1.

As is shown in FIG. 2, the IC card 4 has a control element 11 constituted of a CPU (central processing unit) as a control unit, an erasable non-volatile data memory 12, a working memory 13, a program memory 14, and a contact section 15 to be electrically connected to the read/write section 3. The elements enclosed by the broken line (the control element 11, the data memory 12, the working memory 13 and the program memory 14) each includes one or more IC chips and are buried in the main body of the IC card.

The data memory 12 is used to store various kinds of data and includes, for example, an EEPROM. In this case, the data memory 12 stores feature information for identification represented by a finger projection signal.

The working memory 13 temporarily stores, for example, processing data used during processing by the control element 11, and includes e.g. a RAM (random access memory).

The program memory 14 includes, for example, a mask ROM (read only memory), and stores, for example, processing programs for the control element 11.

Figure 3:
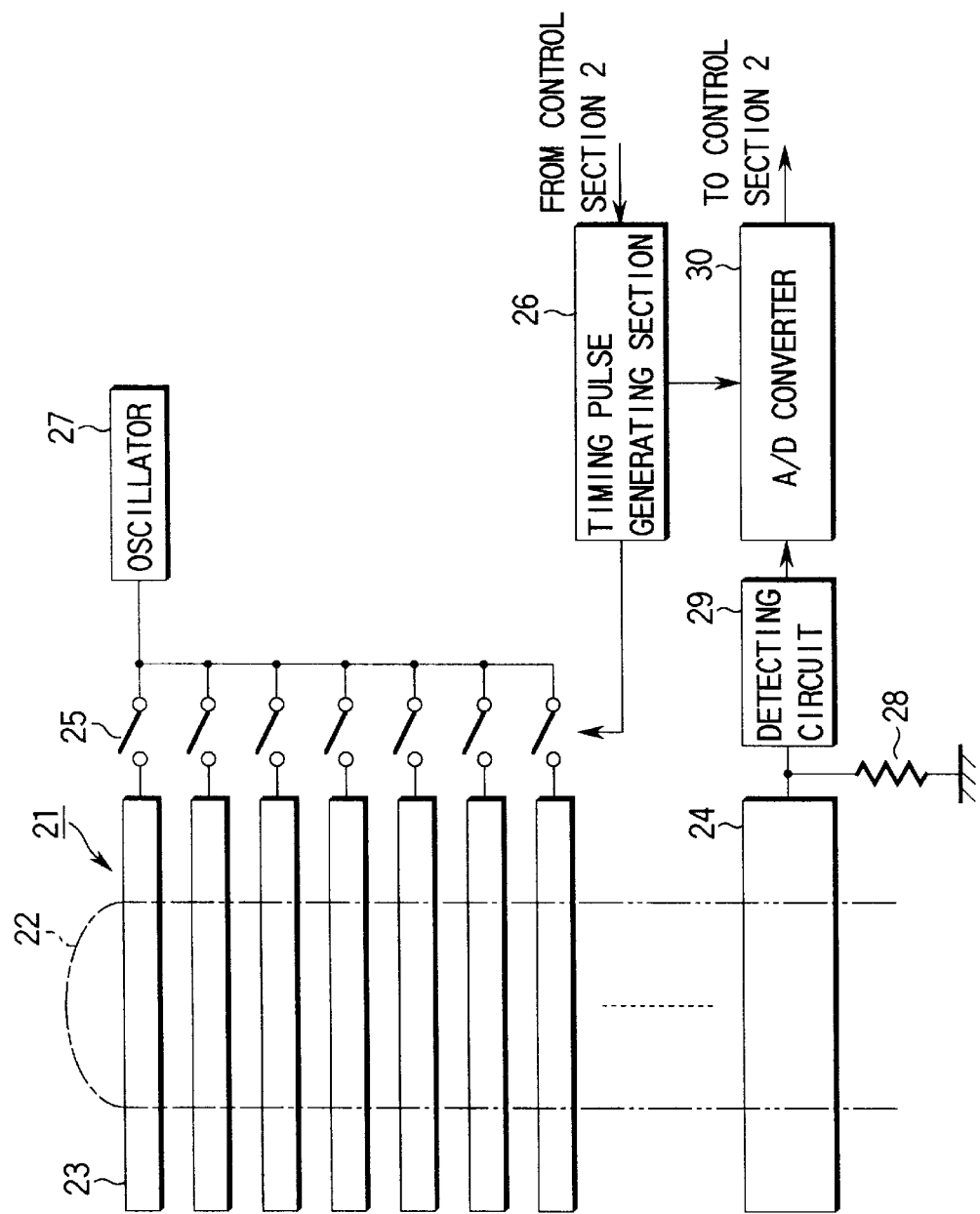
FIG. 3 is a schematic view, showing a structure of a pattern input section applicable to the individual-identifying apparatus of FIG. 1.

FIG. 3 is a schematic view, showing an example of the pattern input section 1.

As is shown in FIG. 3, the pattern input section 1 has a linear electrode array 21 having a plurality of linear electrodes (output electrodes) 23 extending at regular intervals in a first direction, and a single input electrode 24 extending parallel to the output electrodes 23. A finger 22 of a to-be-identified person is put into contact with both the output and input electrodes 23 and 24.

More specifically, about 250 output electrodes, each has a width about 0.1 mm, 23 extend in a direction perpendicular the longitudinal direction of the finger 22 with gaps of, for example, 1/10 mm (i.e. the output electrodes occupy an area with a width of about 50 mm in total). The number of the output electrodes 23, i.e. the size of the linear electrode array 21 in the longitudinal direction of the finger, is set at a value which completely covers the portion of the finger 22 which extends from the tip to the second joint.

The input electrode 24 is located at an end in the longitudinal direction of the finger 22, and formed such that it is longer in a direction perpendicular to the longitudinal direction of the finger 22, and is equal to or slightly longer than the length of the output electrode 23.

An end of each analog switch 25 is connected to a corresponding one of the output electrodes 23.

The group of the analog switches 25 is controlled by a timing pulse signal output from a timing pulse generating section 26, so that the output electrodes 23 will be sequentially turned on at predetermined points of time and be each kept on for a predetermined period of time, in the order beginning from the one which corresponds to the tip of the finger 22.

The other ends of the analog switches 25 are commonly connected to the output terminal of an oscillator 27.

The oscillator 27 outputs a voltage of any voluntary frequency, e.g. 1 MHz. The oscillator may be of an oscillation frequency variable type as described later with reference to FIG. 7, in which the oscillation frequency can be set at a value within a voluntary range or be selected from predetermined frequencies.

The input electrode 24 is grounded via a termination resistor 28 and a power supply (not shown) or the main body of the apparatus (not shown), and also connected to the input terminal of a detection circuit 29.

The output terminal of the detection circuit 29 is connected to the input terminal of an A/D converter 30.

The A/D converter 30 is responsive to a timing pulse signal output form the timing pulse generator 26 for performing A/D conversion.

In the above-described structure, the to-be-identified finger 22 is placed on the linear electrode array 21 in a direction perpendicular to the direction in which the electrodes extend parallel to each other, in order to press the array 21. At this time, the analog switches 25 are sequentially switched from one to another in the longitudinal direction of the finger 22, thereby sequentially connecting the output of the oscillator 27 to the output electrodes 23.

Thereafter, the output of each output electrode 23 is detected, by the input electrode 24, a potential difference between the opposite ends of the termination resistor 28 is detected by the detecting circuit 29. The detected difference detected by the detecting circuit 29 is converted to a digital signal by the A/D converter 30.

Figure 8:
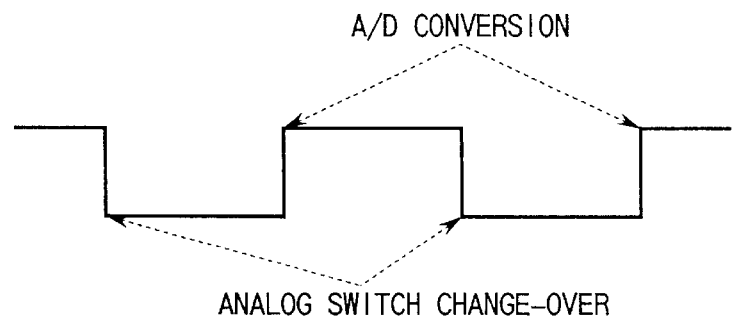
FIG. 8 is a timing chart, showing control timing by a timing pulse used in each of the pattern input sections of FIGS. 3, 4, 5 and 6.

The timing pulse generator 26 generates pulse signals for sequentially switching the analog switches 25 and for controlling the sampling timing of the A/D converter 30. For example, as will be described later with reference to FIG. 8, the analog switches 25 are switched when the pulse signal rises, and the A/D converter 30 is triggered to perform conversion to a digital signal when the pulse signal falls.

The above-described supply of a signal of a predetermined frequency from the oscillator 27 to each output electrode 23, and reception of the output of each output electrode 23 by the input electrode 24 are repeated while changing the oscillation frequency of the oscillator, in accordance with a predetermined routine which will be described later referring to FIGS. 29 to 32.

Figure 4:
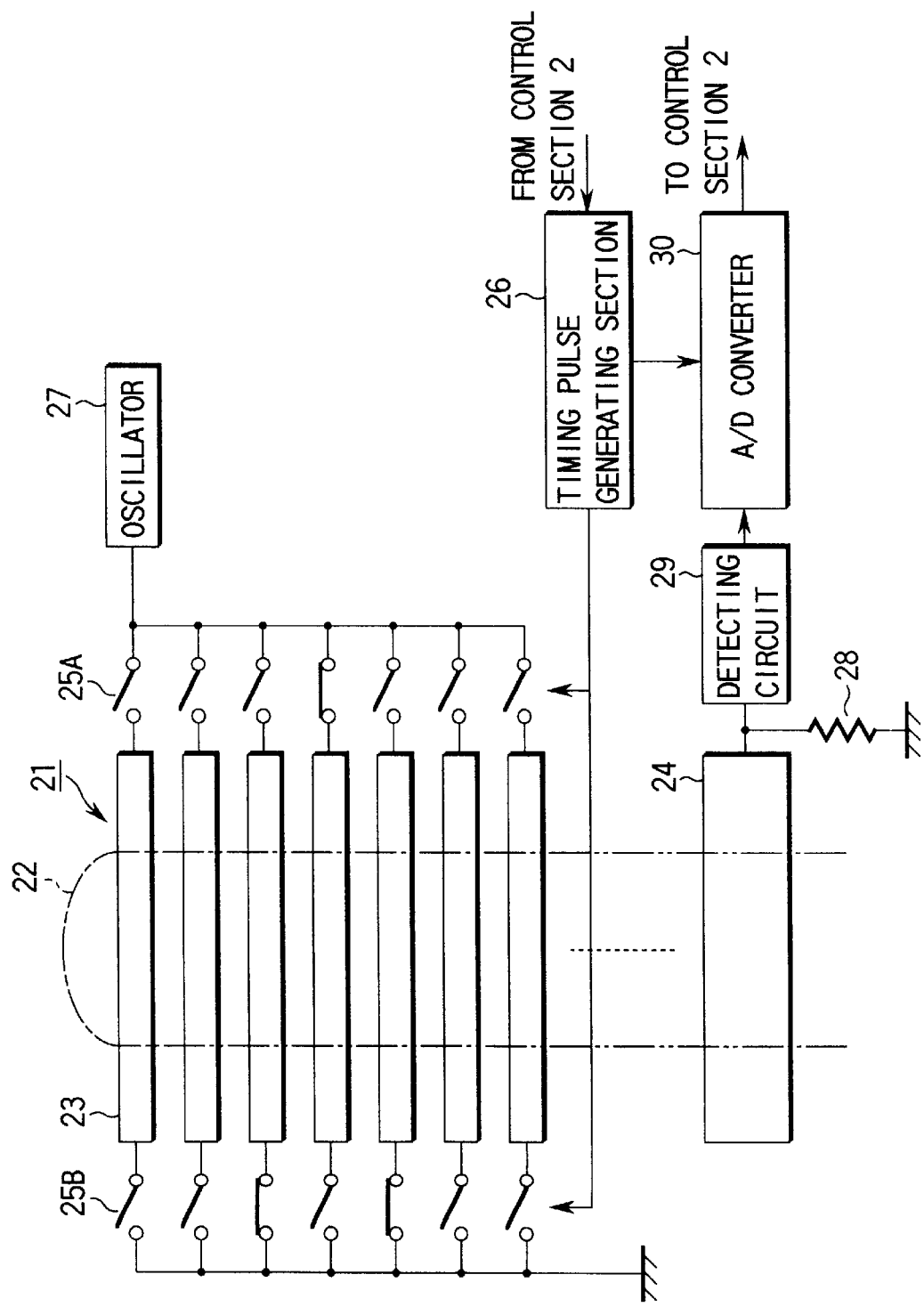
FIG. 4 is a schematic view, showing another structure of the pattern input section, which differs from that of FIG. 3 and is applicable to the individual-identifying apparatus.

FIG. 4 is a schematic view, showing another structure of the pattern input section, which differs from that of FIG. 3 and is applicable to the individual-identifying apparatus. In FIG. 4, elements similar to those shown in FIG. 3 are denoted by corresponding reference numerals, and duplicate explanation is avoided.

In the input section shown in FIG. 4, each of the output electrodes 23 has an end to be connected to an end of a corresponding one of the first analog switches 25A, and the other end connected to an end of a corresponding one of second analog switches 25B. The other ends of the second analog switches 25B are grounded via a power supply (not shown) or the main body of the apparatus (not shown).

The first and second analog switches 25A and 25B are controlled by a timing pulse signal output from the timing pulse generator section 26, so that the output electrodes 23 will be sequentially turned on at predetermined points of time and be each kept on for a predetermined period of time, in the order beginning from the one which corresponds to the tip of the finger 22.

FIG. 4 shows the time points at which the switches of the first and second analog switch groups 25A and 25B are turned on. When as is understood from FIG. 4, one switch of the first analog switch group 25A is turned on, those switches of the second analog switch group 25B, which are connected to the output electrodes 23 located adjacent to the output electrode 23 connected to the turned-on switch, are grounded, thereby preventing occurrence of an undesired noise component in the output electrode 23 connected to the turned-on switch of the group 25A. Further, when the switch of the group 25A, which is connected to one of the output electrodes located at the opposite ends of the linear electrode array 21, is turned on, only the switch of the group 25B, which is connected to the inner output electrode 23 adjacent to the outermost output electrode 23 connected to the turned-on switch of the group A, is grounded.

Figure 5:
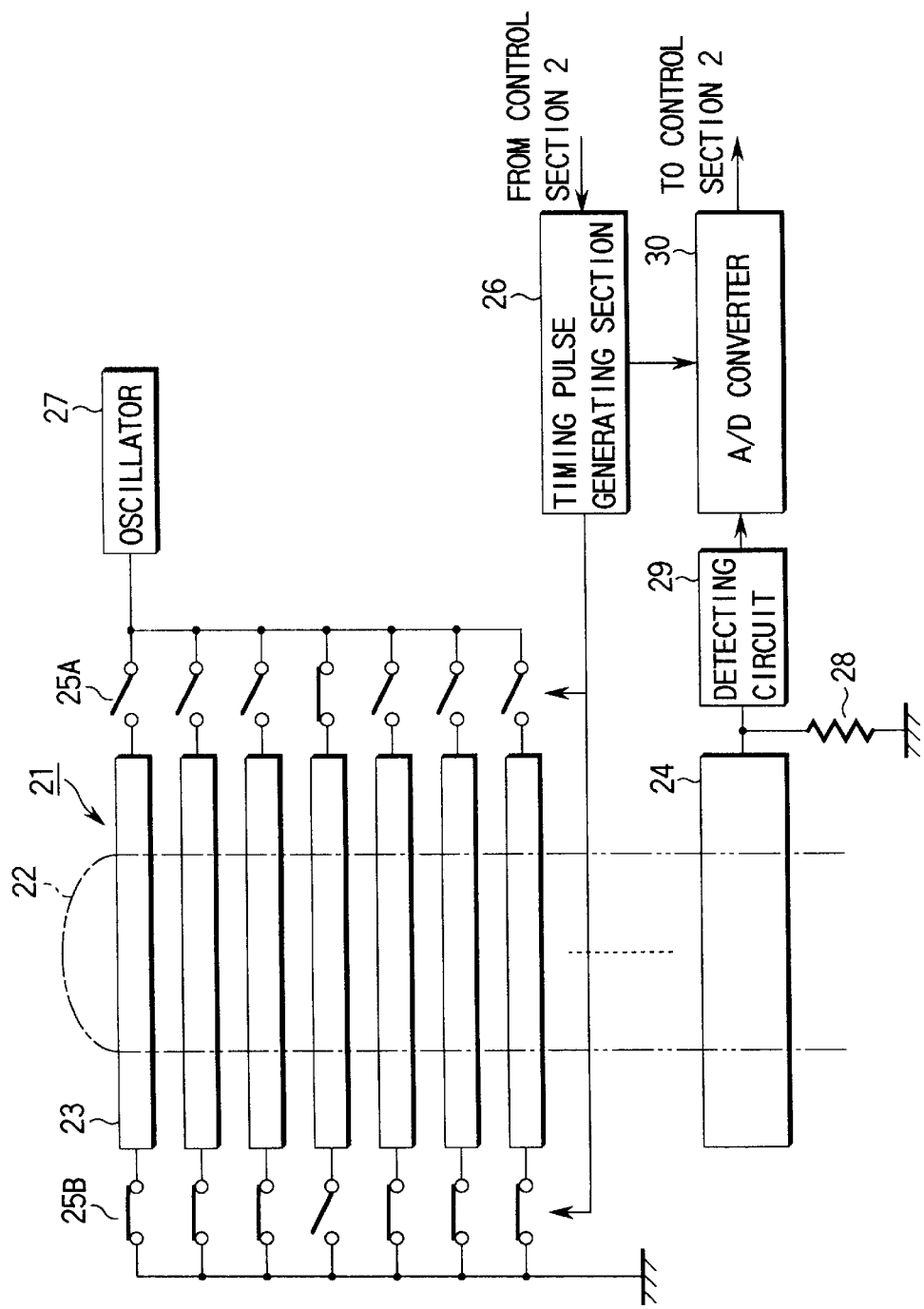
FIG. 5 is a schematic view, useful in explaining an operation of the pattern input section of FIG. 4.

When one of the switches of the group 25A is turned on, occurrence of an undesired noise component in the output electrode 23 connected to the turned-on switch can be avoided more effectively by grounding all the switches of the group 25B other than the switch connected to the output electrode 23 connected to the turned-on switch shown in FIG. 5.

The other ends of the switches of the first analog switch group 25A are commonly connected to the output terminal of the oscillator 27.

The timing pulse generator 26 generates pulse signals for sequentially switching the first and second analog switches 25A and 25B, for switching the turn-on order of the switches 25B in relation to the turn-on order of the switches 25A, and for controlling the sampling timing of the A/D converter 30. For example, as will be described later with reference to FIG. 8, each of the first analog switches 25A is switched when a corresponding one of the pulse signals falls, and the A/D converter 30 is triggered to perform conversion to a digital signal when each of the pulse signals rises. Moreover, the switching time point of the second analog switch group 25B may be a predetermined time after or before the switching time point of the first analog switch group 25A.

Figure 6:
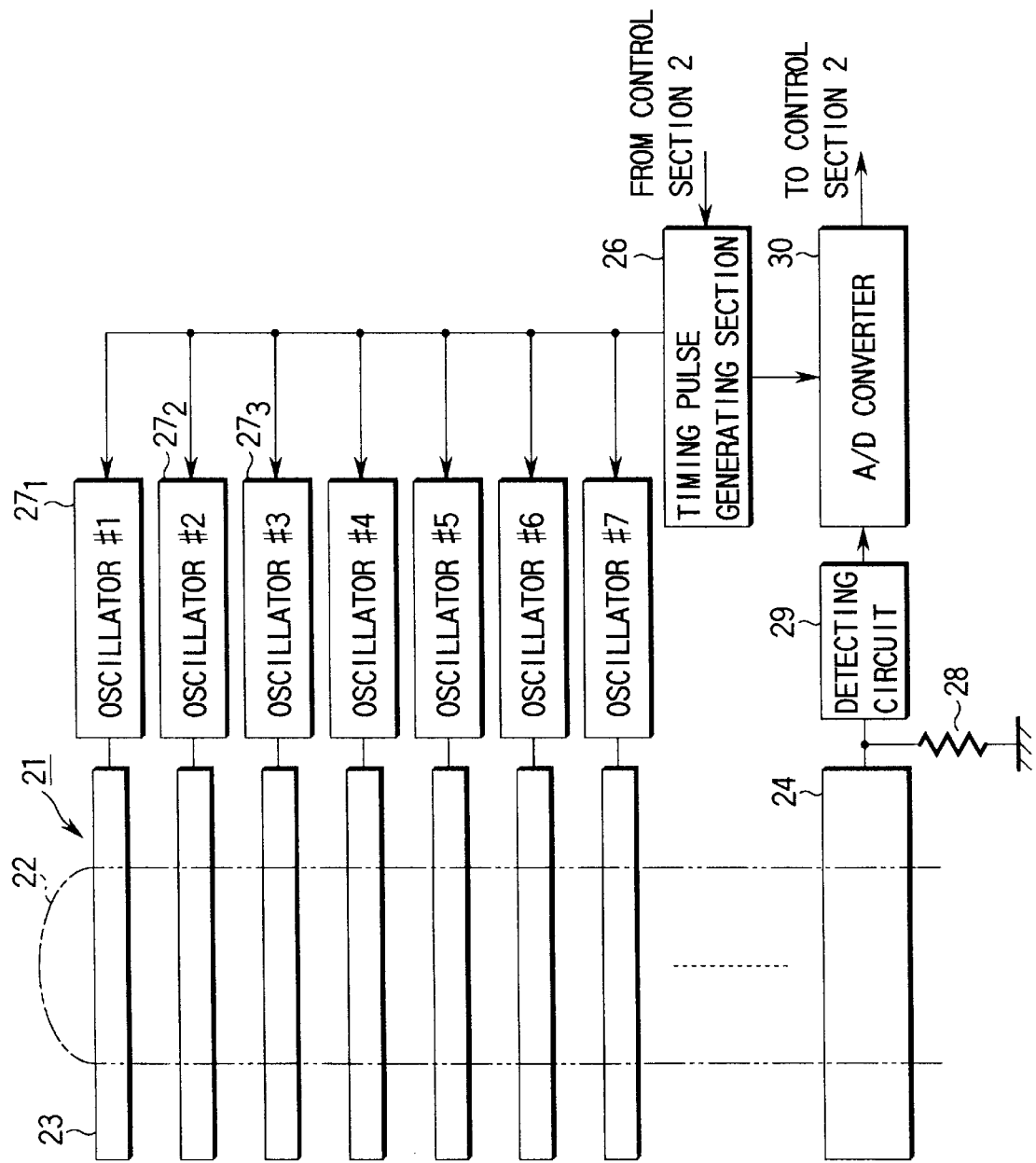
FIG. 6 is a schematic view, showing yet another structure of the pattern input section, which differs from that of FIG. 3 and is applicable to the individual-identifying apparatus.

FIG. 6 is a schematic view, showing yet another structure of the pattern input section, which differs from that of FIG. 3 and is applicable to the individual-identifying apparatus. In FIGS. 3 and 6, like reference numeral denotes like element, and no duplicate explanation will be given.

In the input section shown in FIG. 6, oscillators 27-1, 27-2, . . . are connected to the output electrodes 23, respectively, and controlled to turn on and off by timing pulse signals output from the timing pulse generator 26. The process of obtaining a capacitive impedance using the input electrode 24 with the finger 22 put thereon is same as in the cases of FIGS. 3 and 4, and therefore no duplicate explanation will be given thereof.

Figure 7:
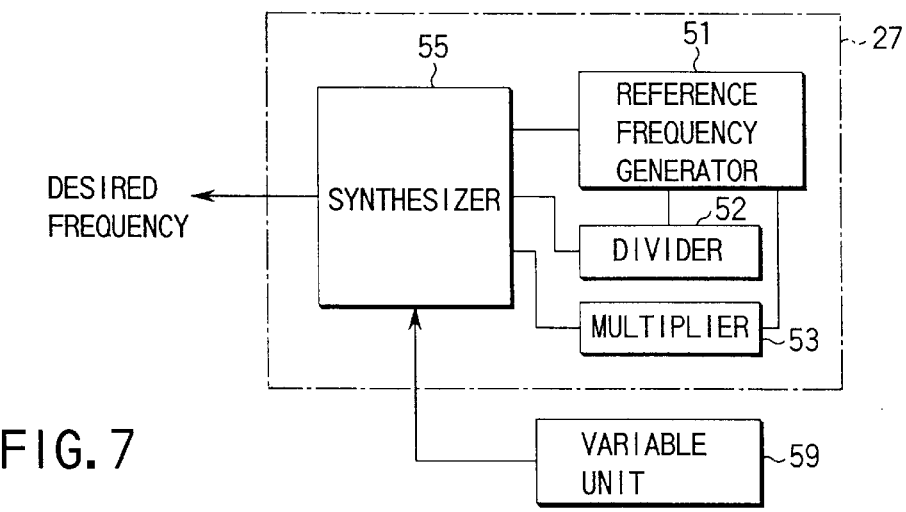
FIG. 7 is a schematic block diagram, showing an example of a frequency variable oscillator applicable to each of the pattern input sections shown in FIGS. 3, 4, 5 and 6.

FIG. 7 is a schematic block diagram, showing an example of a frequency variable oscillator applicable to each of the pattern input sections shown in FIGS. 3, 4, 5 and 6.

As is shown in FIG. 7, the oscillator 27 has a reference frequency generator 51 for oscillating signals of voluntary or preset frequencies; a divider 52 for dividing, at a predetermined ratio, the frequency of a signal output from the generator 51, to thereby create a signal of a frequency lower than the frequency of the original signal; a multiplication unit 53 for multiplying the frequency of a signal output from the generator 51 by a predetermined value to create a signal of a frequency higher than the frequency of the original signal; a variable unit 54 for setting a frequency to be oscillated from the oscillator 27; and a frequency synthesizer 55 for synthesizing, in a voluntary manner, signals of various frequencies output from the reference frequency generator 51, the divider 52 and the multiplying unit 53, to thereby generate a signal of a frequency set by the variable unit 54. Thus, the oscillator 27 generates a signal of any voluntary frequency set by the variable unit 54. Moreover, if the reference frequency generator 51 can output signals of different frequencies, the oscillator 27 can set a wide range of frequencies. The oscillator of this kind can be easily formed of, for example, an FPGA.

Figure 9:
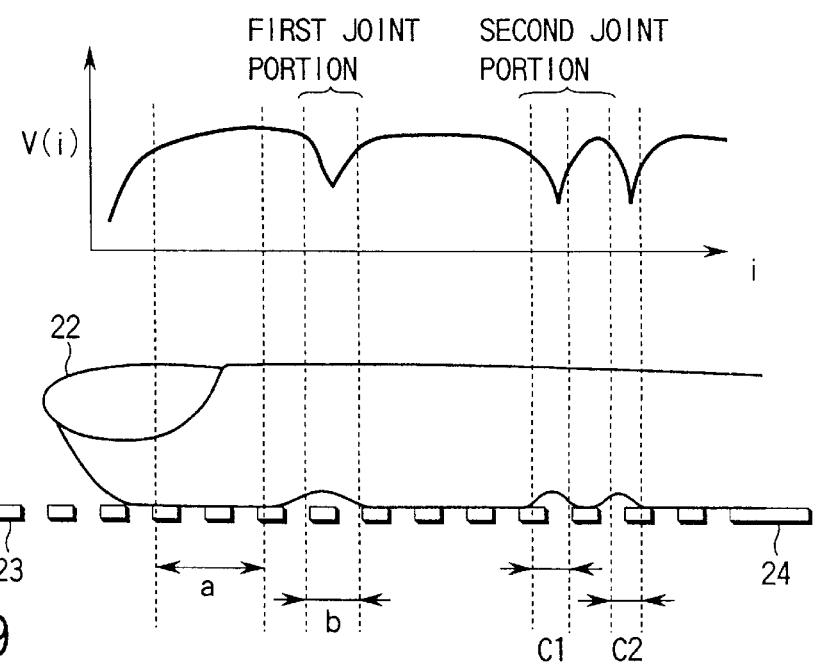
FIG. 9 is a schematic view, showing the relationship between a state in which a finger put on each of the pattern input sections of FIGS. 3, 4, 5 and 6 is viewed laterally, and the level of a signal output in accordance with the irregularity of the finger surface.

FIG. 9 shows the relationship between a state in which the finger 22 put on the linear electrode array 21 is viewed laterally, and the level of a signal output in accordance with the irregularity of the finger surface.

In FIG. 9, in an area (a), for example, in which the finger 22 and the output electrode 23 are in contact with each other, the capacitive coupling therebetween is strong and the impedance Z(i) is low, which means that the output signal V(i) has a high level.

On the other hand, in a wrinkle area (b) near the first joint of the finger, or in a wrinkle area (c1) or (c2) near the second join of the finger, in which the finger 22 does not contact the output electrode 23, the capacitive coupling therebetween is weak and the impedance Z(i) is high, which means that the output signal V(i) has a low level.

Accordingly, if the first-dimensional output obtained when a signal is supplied to each output electrode 23 is plotted along the length of the finger 22, the output signal V(i) sharply drops in wrinkle or joint areas. In other words, the output signal V(i) has information concerning the irregularity of the finger 22. This signal V(i) will be hereinafter referred to as a "projection signal (indicative of feature information)".

The projection signal V(i) indicative of a voluntary portion of the finger and obtained when a signal is supplied to a corresponding output electrode 23, is given by $$V(i)=R \times Vo/(Z(i)+Zf+Zc+R)$$

where R represents the impedance of the termination resistor 28, Vo the amplitude of the output voltage of the oscillator 27, Z(i) the impedance due to capacitive coupling between an i-th output electrode 23 and the finger 22, Zf the impedance of the finger 22 itself, and Zc the impedance due to capacitive coupling between the finger 22 and the input electrode 24.

In the above-described input method, the impedance Z(i) is inevitably influenced by a contact resistance between the finger 22 and the output electrode 23 where the finger 22 is in contact with the output electrode 23, which means that the resultant information cannot completely be free from the influence of the state of the finger surface. However, selecting, from some frequencies, the frequency to be output from the oscillator 27 enables the impedance due to the capacitive coupling to be made sufficiently lower than the contact resistance, and also the influence of an outside noise component upon the information to be eliminated. Thus, a change in the projection signal V(i) due to a change in the surface state of the finger 22 can be minimized, which means that a stable signal can be obtained at all times.

Figure 10:
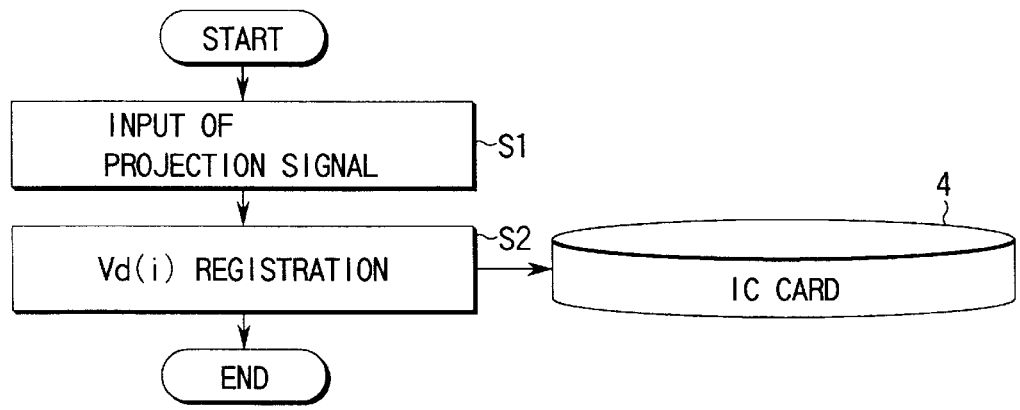
FIG. 10 is a flowchart, useful in explaining a registration procedure performed in the individual-identifying apparatus of FIG. 1.

The processes performed in the above-described structure will now be described. The processes mainly include "registration" and "identification". First, the process of registration will be explained with reference to the flowchart of FIG. 10.

First, in a step S1, the pattern input section 1 inputs the projection signal V(i) indicative of the finger 22.

In the next step S2, the projection signal V(i) input in the step S1 is registered in the data memory 12 of the IC card 4 and used as dictionary information, i.e. feature information Vd(i) for identification.

The process of identification will be explained with reference to the flowchart of FIG. 11.

First, in a step S3, the pattern input section 1 inputs the projection signal V(i) indicative of the finger 22.

In the next step S4, the projection signal V(i) input in the step S3 is compared, by calculation for identification, with the dictionary information Vd(i) stored in the data memory 12 of the IC card 4.

The calculation for identification is realized by calculating the degree-of-difference E in a manner described below.

As a preparatory process for obtaining the degree-of-difference E, the finger pattern indicated by the dictionary information Vd(i) read from the data memory 12 of the IC card 4, is aligned with the finger pattern indicated by the projection signals V(i) based on the input finger image, using the following equations (2) and (3):

$$S(m) = \sum_{i=1}^{N-m} \{V(i+m) - Vd(i)\}^2 / (N - m), m \geq 0 \quad (2)$$

$$S(m) = \sum_{i=-m+1}^{N} \{V(i+m) - Vd(i)\}^2 / (N + m), m < 0 \quad (3)$$

In this case, S(m) represents the sum of values obtained by squaring, across a certain range, the difference between Vd(i) and V(i+m) which is displaced by m from Vd(i). In the formulas (2) and (3), N represents the number of V(i) components.

The thus-obtained S(m) represents a parameter indicative of the degree of coincidence between V(i+m) and Vd(i). The smaller the value of S(m), the higher the degree of the coincidence. In the positioning, m is varied within a certain range, and the value M of m which is obtained when S(m) has a minimum value is referred to as a positioning error. At the value M, the positioning is considered to be completed.

Then, the degree-of-difference E is calculated using the following equations (4) and (5):

$$E(m) = \sum_{i=1}^{N-M} \{V(i+M) - Vd(i)\}^2 / \sum_{i=1}^{N-M} Vd(i)^2, M \geq 0 \quad (4)$$

$$E(m) = \sum_{i=M+1}^{N} \{V(i+M) - Vd(i)\}^2 / \sum_{i=-M+1}^{N} Vd(i)^2, M < 0 \quad (5)$$

where N represents the number of V(i) components.

The degree-of-difference E given from the equations (4) and (5) is obtained by squaring the difference between the aligned input signal V(i+M) and the dictionary information Vd(i), summing the squaring results across a certain range, and normalizing the resultant sum using the sum of values obtained by squaring the dictionary information Vd(i) across the same range.

The degree-of-difference E indicates the degree of difference between the positioned input signal V(i+M) and the dictionary information Vd(i). The higher the degree-of-difference, the greater the difference, whereas the lower the degree-of-difference, the smaller the difference.

Thereafter, in a step S5, the thus-obtained degree-of-difference E is compared with a predetermined threshold value TH. If E TH, the program proceeds to a step S6, the to-be-identified person is identified.

If in the step S5, E>TH (not E≦TH), it is determined in a step S7 that the person is not identified, thereby terminating the process.

After the termination of the identification process, the control section Z sends the determination result to the host machine 5.

The host machine 5 performs processing according to the determination result. For example, the host machine 5 opens the door when the person is identified, and gives the alarm by e.g. buzzer when the person is not identified.

Figure 12:
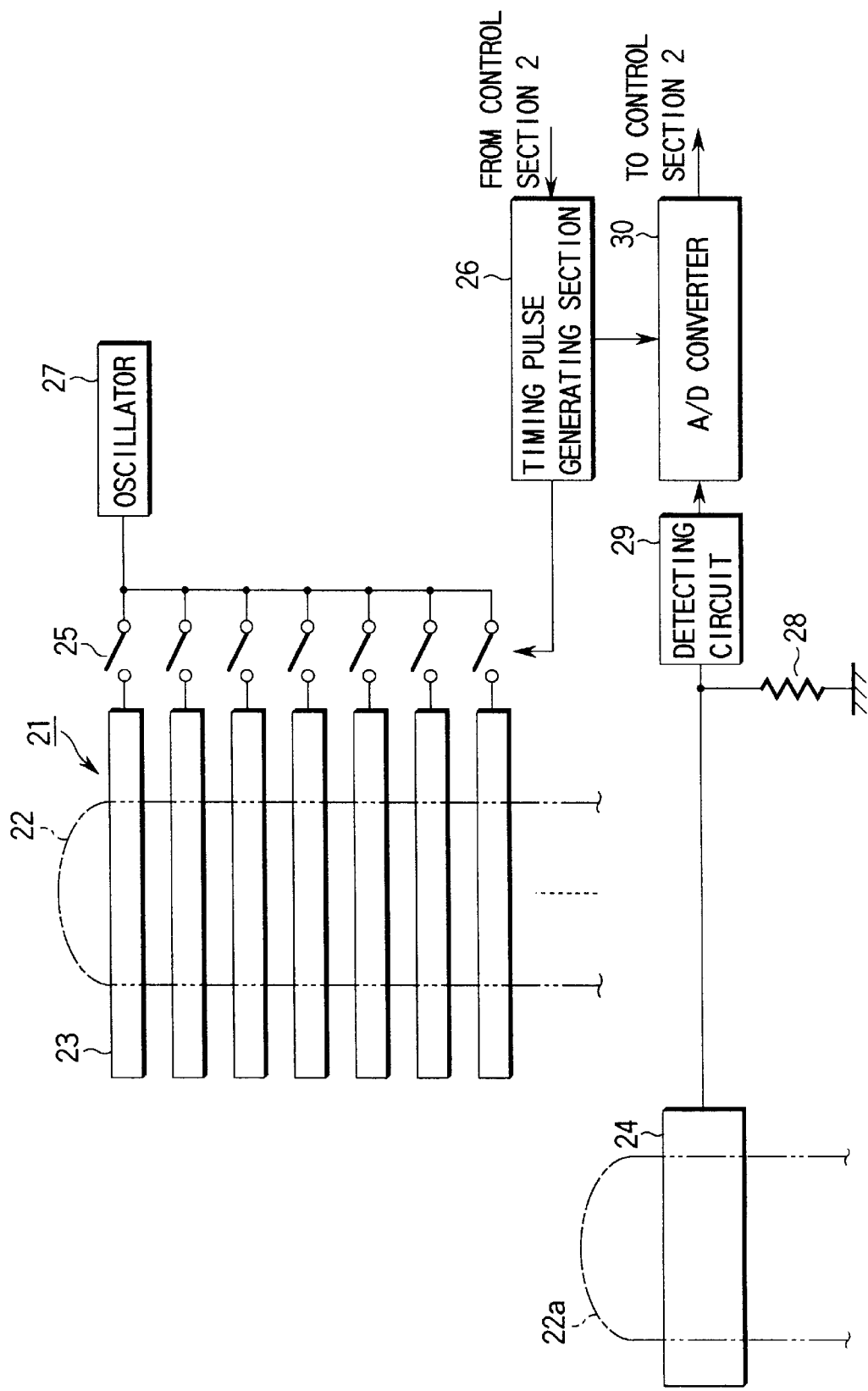
FIG. 12 is a block diagram, showing a structure of a pattern input section incorporated in an individual-identifying apparatus according to a second embodiment.

FIG. 12 is a schematic view, showing an individual-identifying apparatus according to a second embodiment of the invention.

This embodiment differs from the input sections of FIGS. 3 and 4 in that the input electrode 24 is separated from the output electrodes 23 by a predetermined distance. In this structure, a finger 22a to be put on the input electrode 24 may differ from the to-be-identified finger 22 to be put on the output electrodes 23. The other structural elements of the individual-identifying apparatus of the second embodiment, and the registration and identification processes are similar to those in the first embodiment shown in FIGS. 1 to 11. Therefore, no duplicate description will be given thereof, and only the characterizing portion of the pattern input section 1 will be described.

Figure 13:
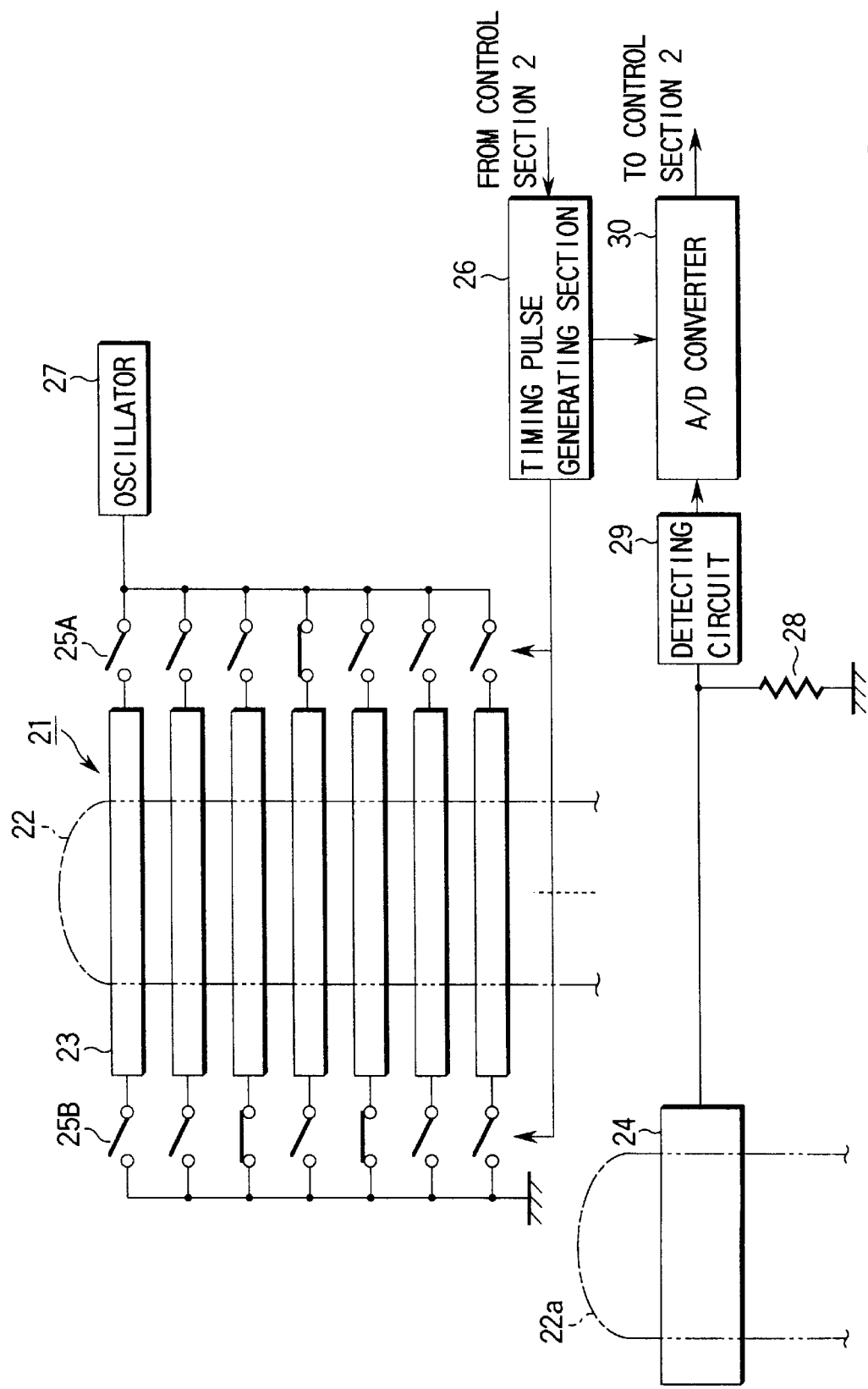
FIG. 13 is a schematic view, showing another structure of the pattern input section of FIG. 12.

FIG. 13 shows a structure in which the input electrode 24 is separated from the output electrodes 23 by a predetermined distance. In this structure, a finger 22a to be put on the input electrode 24 may differ from the to-be-identified finger 22 put on the output electrodes 23. This structure can also provide an advantage similar to the first embodiment. Moreover, as aforementioned with reference to FIG. 5, when one switch of the first analog switch group 25A is turned on, occurrence of an undesired noise component in the output electrode 23 connected to the turned-on switch can be avoided more effectively by grounding all the switches of the group 25B other than the switch connected to the output electrode 23 connected to the turned-on switch.

Figure 14:
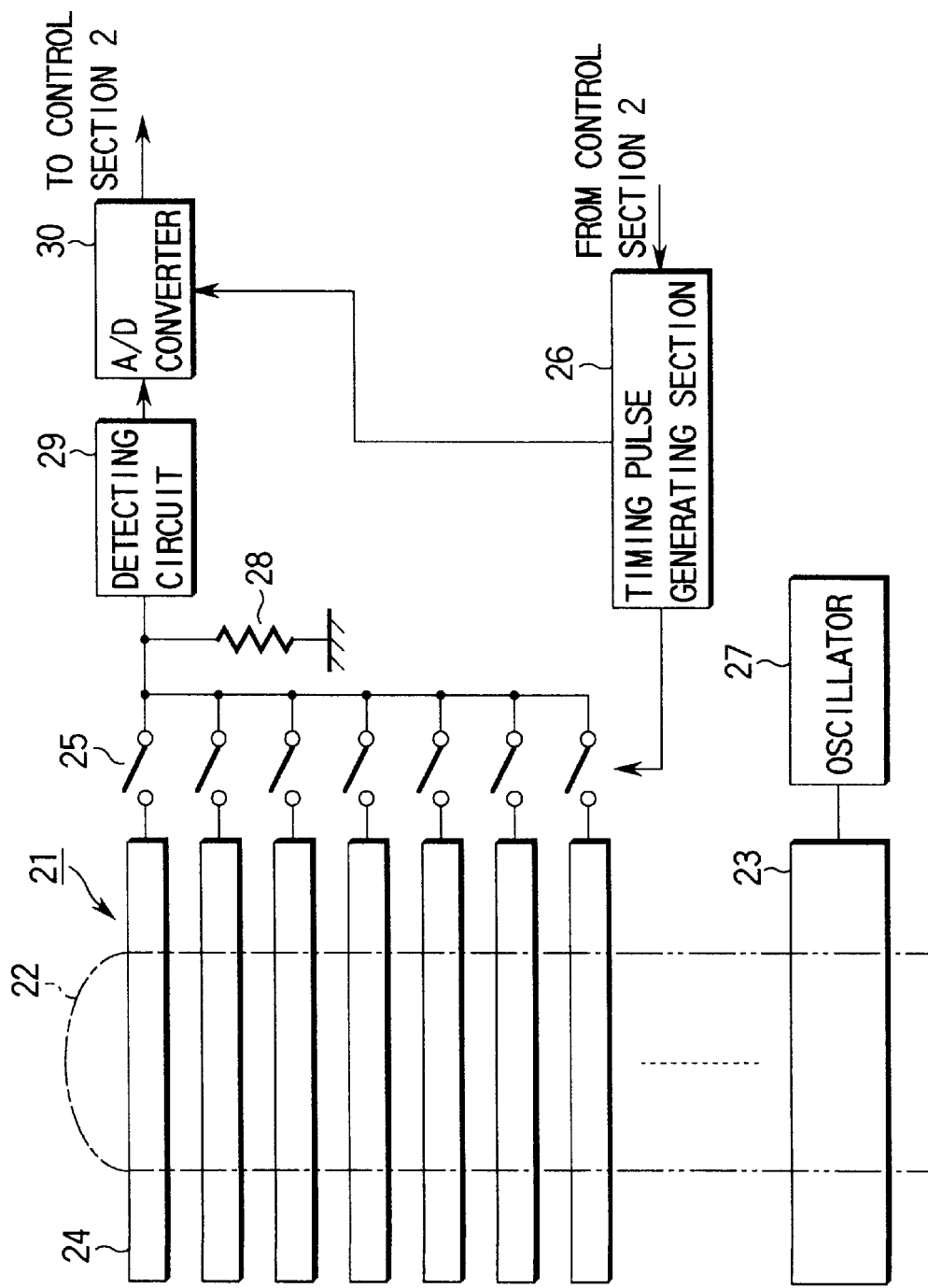
FIG. 14 is a block diagram, showing a structure of a pattern input section incorporated in an individual-identifying apparatus according to a third embodiment.

FIG. 14 shows a third embodiment of the invention. As is shown in FIG. 14, this embodiment has a linear electrode array 21 having a plurality of linear electrodes (input electrodes) 24 extending at regular intervals in a first direction, and a single output electrode 23 extending parallel to the input electrodes 24. A to-be-identified finger 22 of a to-be-identified person is put into contact with both the output and input electrodes 23 and 24.

More specifically, about 250 input electrodes, each has a width about 0.1 mm, 24 extend in a direction perpendicular the longitudinal direction of the finger 22 with gaps of, for example, 1/10 mm (i.e. the input electrodes occupy an area with a width of about 50 mm in total). The number of the input electrodes 24, i.e. the size of the linear electrode array 21 in the longitudinal direction of the finger, is set at a value which completely covers the portion of the finger 22 which extends from the tip to the second joint.

An end of each analog switch 25 is connected to a corresponding one of the input electrodes 24.

The output terminal of the oscillator 27 is connected to the output electrode 23. The oscillator 27 is an oscillation frequency variable circuit as shown in FIG. 7, and hence can output a predetermined frequency, a frequency falling within a voluntary range, or one selected from predetermined frequencies.

The input electrodes 24 can be connected to a single line and to the termination resistor 28 via the analog switches 25. The potential difference between the opposite ends of the termination resistor 28 is detected by the detecting circuit 29. The output of the circuit 29 is converted to a digital signal by the A/D converter 30.

The above structure can provide a stable projection signal free from the influence of the surface state of the finger 22 (for example, whether or not the surface is damp), as in the case of the FIG. 3 pattern input section 1 of the first embodiment.

Figure 15:
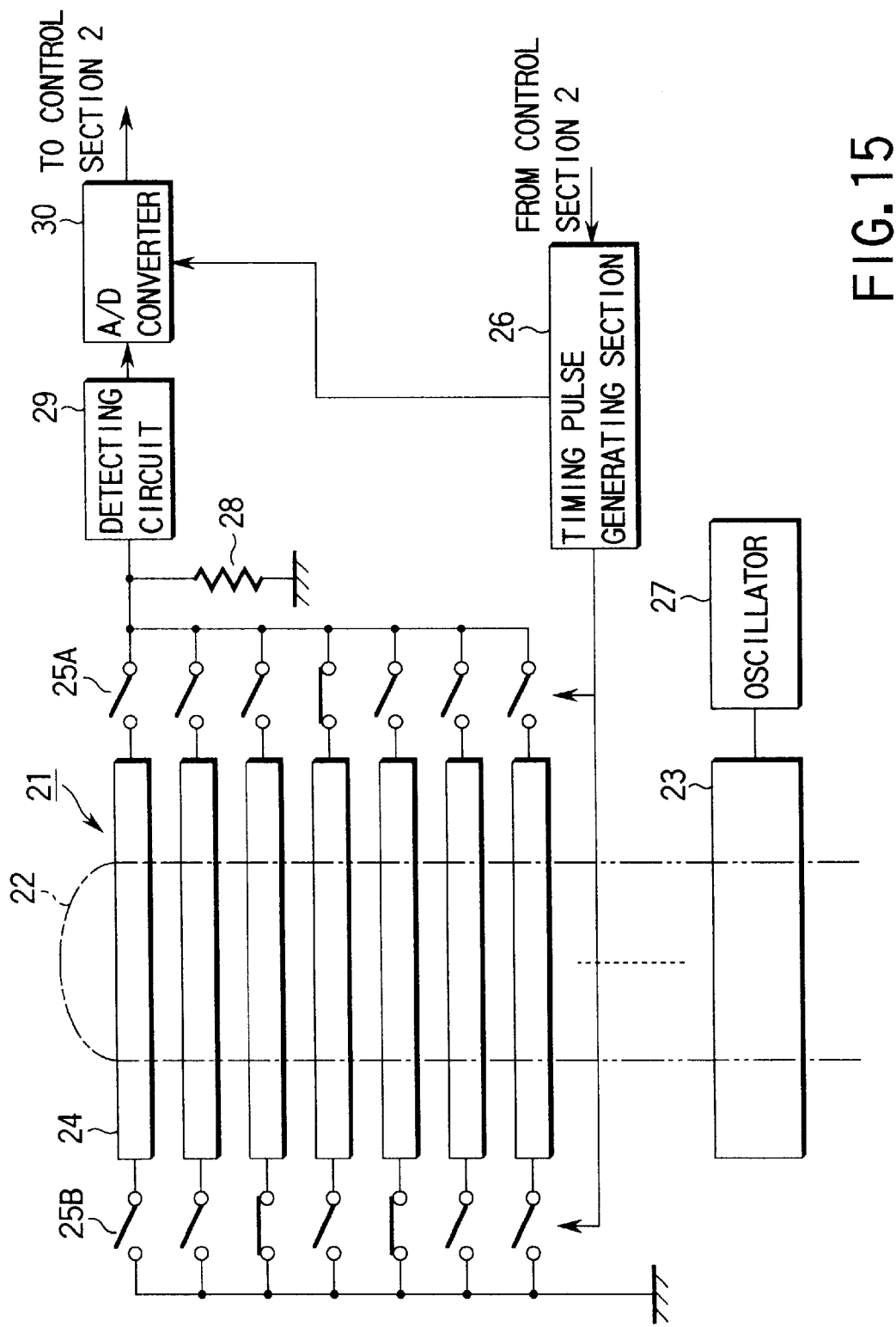
FIG. 15 is a schematic view, showing another structure of the pattern input section of FIG. 14.

FIG. 15 shows a modification of the pattern input section of FIG. 14. In the FIG. 15 case, the structure of the main body of the individual-identifying apparatus, and the registration and identification processes are similar to those shown in FIGS. 1 to 11. Therefore, no duplicate description will be given thereof.

The individual-identifying apparatus shown in FIG. 15 comprises a linear electrode array 21 having a plurality of linear electrodes (input electrodes) 24 extending at regular intervals in a first direction, and a single output electrode 23 extending parallel to the input electrodes 24. A to-be-identified finger 22 of a to-be-identified person is put into contact with both the output and input electrodes 23 and 24.

More specifically, about 250 input electrodes 24 extend in a direction perpendicular the longitudinal direction of the finger 22 with gaps of, for example, 1/10 mm (i.e. the input electrodes occupy an area with a width of about 50 mm in total). The number of the input electrodes 24, i.e. the size of the linear electrode array 21 in the longitudinal direction of the finger, is set at a value which completely covers the portion of the finger 22 which extends from the tip to the second joint.

An end of each analog switch 25A is to be connected to a corresponding one of the input electrodes 24. Further, the other end of each input electrode 24 is connected to an end of a corresponding one of second analog switches 25B. The other ends of the second analog switches 25B are grounded via a power supply (not shown) or the main body of the apparatus (not shown).

The output terminal of the oscillator 27 is connected to the output electrodes 23.

The input electrodes 24 can be connected to a single line and the termination resistor 28 via the analog switches 25. The potential difference between the opposite ends of the termination resistor 28 is detected by the detecting circuit 29. The output of the circuit 29 is converted to a digital signal by the A/D converter 30.

The above structure can provide a stable projection signal free from the influence of the surface state of the finger 22 (for example, whether or not the surface is damp), as in the case of the FIG. 3 pattern input section 1 of the first embodiment. Moreover, when one of the switches of the group 25A is turned on, occurrence of an undesired noise component in the output electrode 23 connected to the turned-on switch can be avoided more effectively, as in the FIG. 5 case, by grounding all the switches of the group 25B other than the switch connected to the output electrode 23 connected to the turned-on switch.

Figure 16:
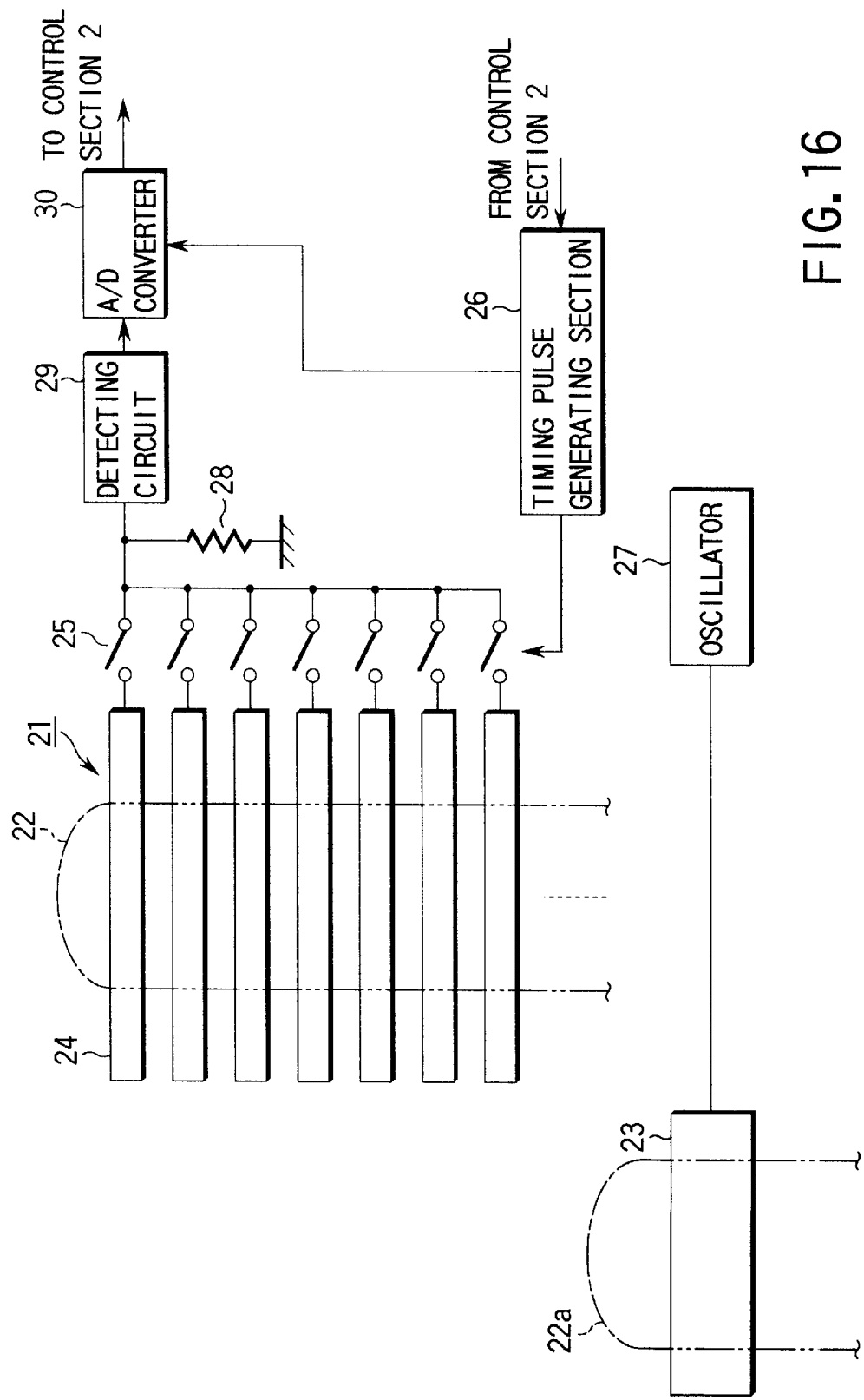
FIG. 16 is a block diagram, showing a structure of a pattern input section incorporated in an individual-identifying apparatus according to a fourth embodiment.

FIG. 16 is a schematic view, showing an individual-identifying apparatus according to a fourth embodiment. Also in the FIG. 16 case, the structure of the main body of the individual-identifying apparatus, and the registration and identification processes are similar to those shown in FIGS. 1 to 11. Therefore, no duplicate description will be given thereof.

As is shown in FIG. 16, the pattern input section has a linear electrode array 21 having a plurality of linear electrodes (input electrodes) 24 extending at regular intervals in a first direction, and a single output electrode 23 extending parallel to the input electrodes 24. The output electrode 23 is separated from the input electrodes 24 by a predetermined distance. In this structure, a finger 22a to be put on the input electrodes 24 may differ from the to-be-identified finger 22 to be put on the output electrodes 23. Moreover, the object which is to be put into contact with the output electrode 23 is not limited to the finger 22a, but may be any other portion of the body of the to-be-identified person.

Figure 17:
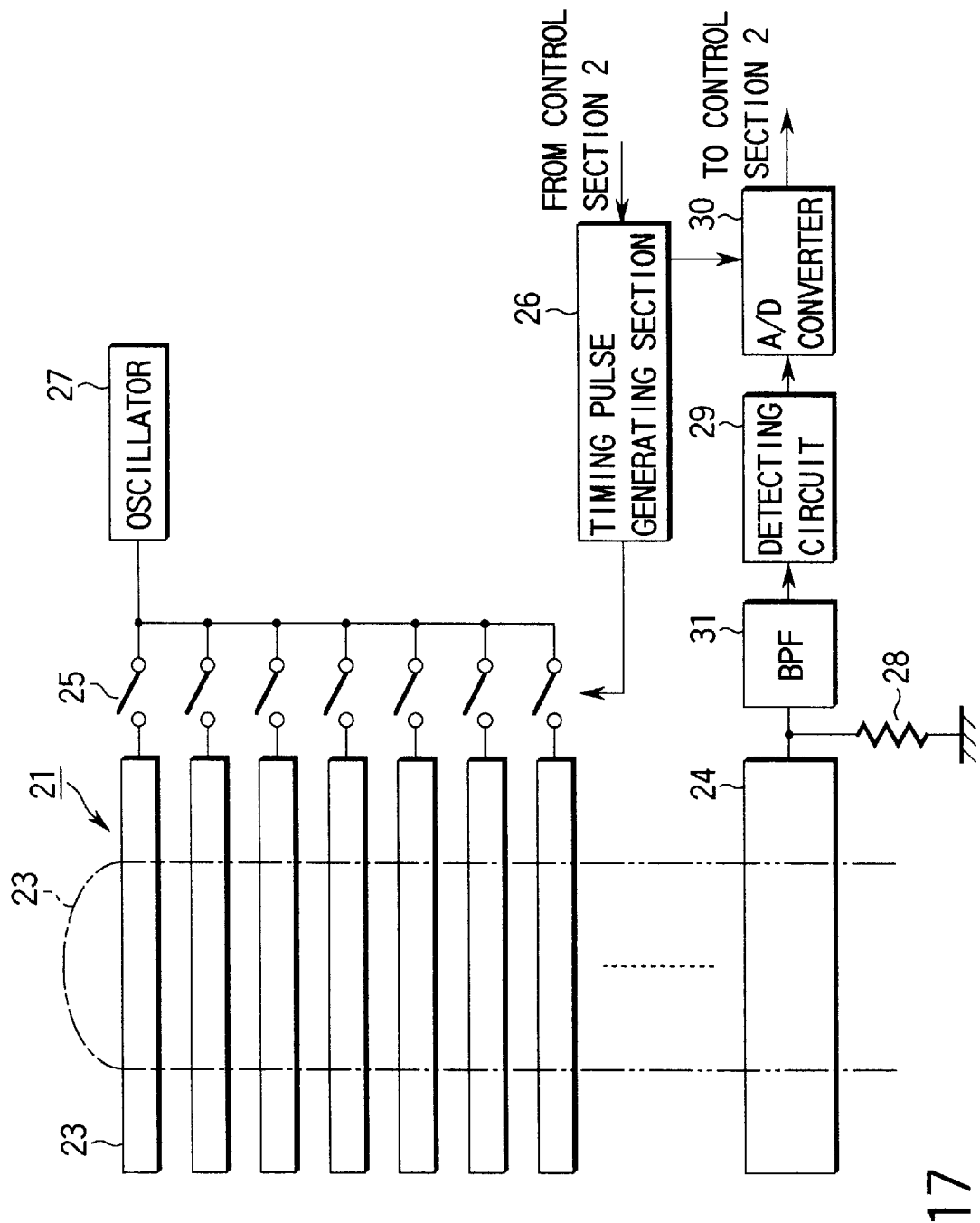
FIG. 17 is a block diagram, showing a structure of a pattern input section incorporated in an individual-identifying apparatus according to a fifth embodiment.

FIG. 17 is a schematic view, showing a modification of the pattern input section of the first embodiment shown in FIG. 3. In FIG. 17, elements similar to those shown in FIG. 3 are denoted by corresponding reference numerals, and duplicate description thereof will be avoided.

As is shown in FIG. 17, the pattern input section 1 has a linear electrode array 21 having a plurality of linear electrodes (output electrodes) 23 extending at regular intervals in a first direction, and a single input electrode 24 extending parallel to the output electrodes 23. A finger 22 of a to-be-identified person is put into contact with both the output and input electrodes 23 and 24. In addition, the input electrode 24 is located at an end in the longitudinal direction of the finger 22, and formed such that it is longer in a direction perpendicular to the longitudinal direction of the finger 22, and is equal to or slightly longer than the length of the output electrode 23.

An end of each analog switch 25 is connected to a corresponding one of the output electrodes 23. The group of the analog switches 25 is controlled by a timing pulse signal output from a timing pulse generating section 26, so that the output electrodes 23 will be sequentially turned on at predetermined points of time and be each kept on for a predetermined period of time, in the order beginning from the one which corresponds to the tip of the finger 22.

The other ends of the analog switches 25 are commonly connected to the output terminal of an oscillator 27. As in the other embodiments described above, the oscillation frequency of the oscillator 27 is predetermined, or is selected within a voluntary range or from predetermined frequencies.

The input terminal 24 is grounded via the termination resistor 28, and a power supply (not shown) supply or the main body of the apparatus, and also connected to the input terminal of the detecting circuit 29 via a BPF (bandpass filter unit) 31. As will be described later with reference to FIG. 20, the BPF 31 can deal with a plurality of frequencies although it includes a single band filter with a fixed bandpass characteristic in this embodiment.

The output terminal of the detecting circuit 29 is connected to the input terminal of an A/D converter 30.

The A/D converter 30 is responsive to a timing pulse signal output form the timing pulse generator 26 for performing A/D conversion.

In the above-described structure, the to-be-identified finger 22 is placed on the linear electrode array 21 in a direction perpendicular to the direction in which the electrodes extend parallel to each other, in order to press the array 21. At this time, the analog switches 25 are sequentially switched from one to another in the longitudinal direction of the finger 22, thereby sequentially connecting the output terminal of the oscillator 27 to each of the output electrodes 23.

Thereafter, the output of each output electrode 23 is detected, by the input electrode 24, a potential difference between the opposite ends of the termination resistor 28. The detected difference is converted to a digital signal by the A/D converter 30.

As is well known by anyone skilled in the art, the BPF 31 is adapted to pass only signals of a predetermined band, and therefore the apparatus can be effectively protected from undesired outside noise, and hence provide a more stable projection signal.

Figure 18:
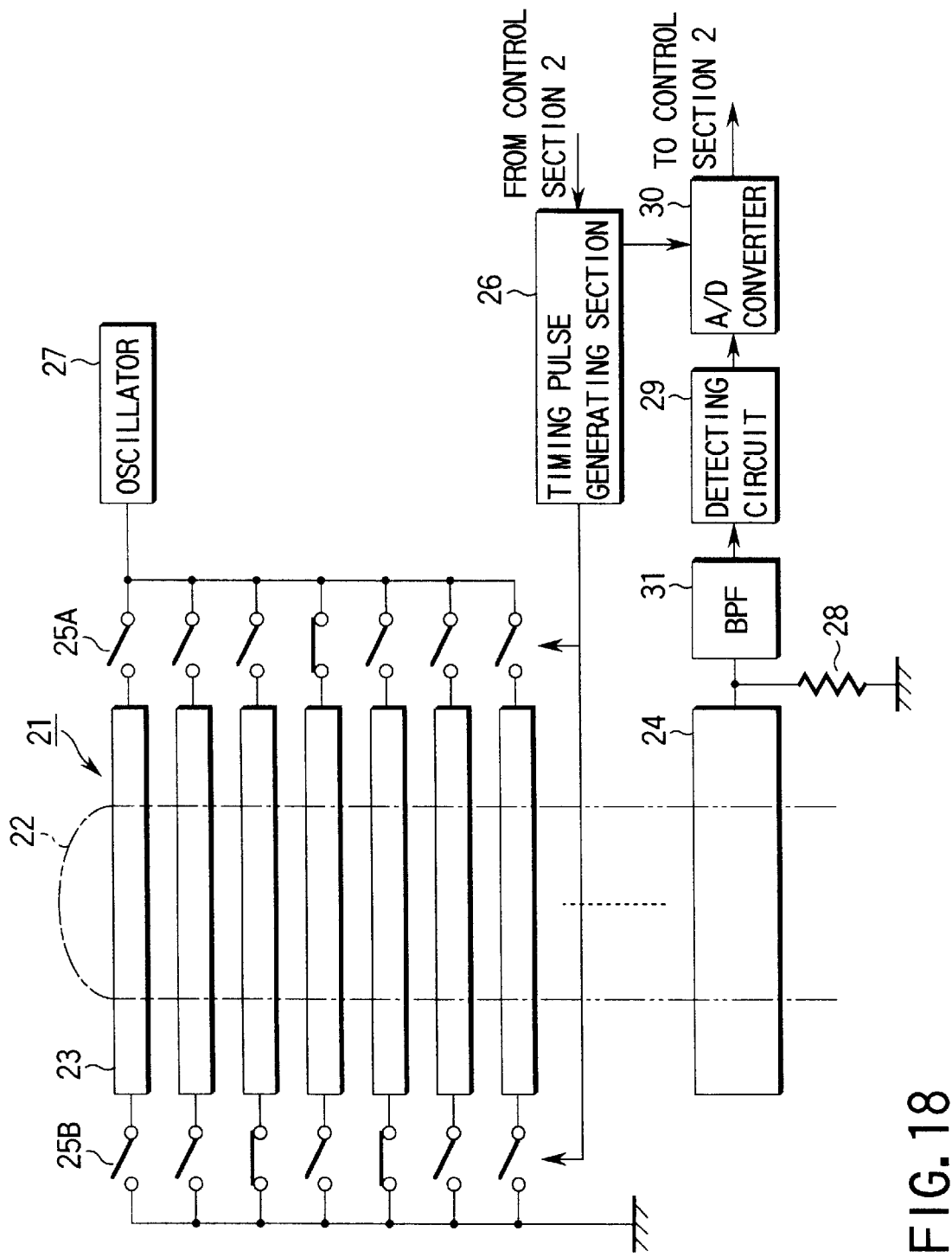
FIG. 18 is a schematic view, showing another structure of the pattern input section of FIG. 17.

FIG. 18 is a schematic view, showing a modification of the pattern input section of the first embodiment shown in FIG. 4. In FIG. 18, elements similar to those shown in FIG. 4 are denoted by corresponding reference numerals, and duplicate description thereof will be avoided.

As is shown in FIG. 18, the pattern input section 1 has a linear electrode array 21 having a plurality of linear output electrodes 23 extending at regular intervals, and a single input electrode 24 extending parallel to the output electrodes 23. A finger 22 of a to-be-identified person is put into contact with both the output and input electrodes 23 and 24. In addition, the input electrode 24 is located at an end in the longitudinal direction of the finger 22, and formed such that it is longer in a direction perpendicular to the longitudinal direction of the finger 22, and is equal to or slightly longer than the length of the output electrode 23.

Each of the output electrodes 23 has an end to be connected to an end of a corresponding one of the first analog switches 25A, and the other end connected to an end of a corresponding one of second analog switches 25B. The other ends of the second analog switches 25B are grounded via a power supply (not shown) or the main body of the apparatus (not shown).

The first and second analog switches 25A and 25B are controlled by a timing pulse signal output from the timing pulse generator section 26, so that the output electrodes 23 will be sequentially turned on at predetermined points of time and be each kept on for a predetermined period of time, in the order beginning from the one which corresponds to the tip of the finger 22.

When one switch of the first analog switch group 25A is turned on, those switches of the second analog switch group 25B, which are connected to the output electrodes 23 located adjacent to the output electrode 23 connected to the turned-on switch, are grounded, thereby preventing occurrence of an undesired noise component in the output electrode 23 connected to the turned-on switch of the group 25A. Further, when the switch of the group 25A, which is connected to one of the output electrodes located at the opposite ends of the linear electrode array 21, is turned on, only the switch of the group 25B, which is connected to the inner output electrode 23 adjacent to the outermost output electrode 23 connected to the turned-on switch of the group A, is grounded.

The other ends of the first analog switches 25A are commonly connected to the output terminal of the oscillator 27. The oscillation frequency of the oscillator 27 is set at, for example, 1 MHz, or at a voluntary frequency supplied from the frequency variable oscillator shown in FIG. 7.

The input terminal 24 is grounded via the termination resistor 28, and a power supply (not shown) supply or the main body of the apparatus, and also connected to the input terminal of the detecting circuit 29 via a BPF 31. The output terminal of the phase detecting circuit 29 is connected to the input terminal of an A/D converter 30.

The A/D converter 30 is responsive to a timing pulse signal output form the timing pulse generator 26 for performing A/D conversion.

As explained above referring to FIG. 5, when one of the switches of the group 25A is turned on to output a voluntary frequency from the output electrode 23 connected to the tuned-on switch, occurrence of an undesired noise component in the output electrode 23 can be avoided more effectively by grounding all the switches of the group 25B other than the switch connected to the output electrode 23 which is connected to the turned-on switch.

Figure 19:
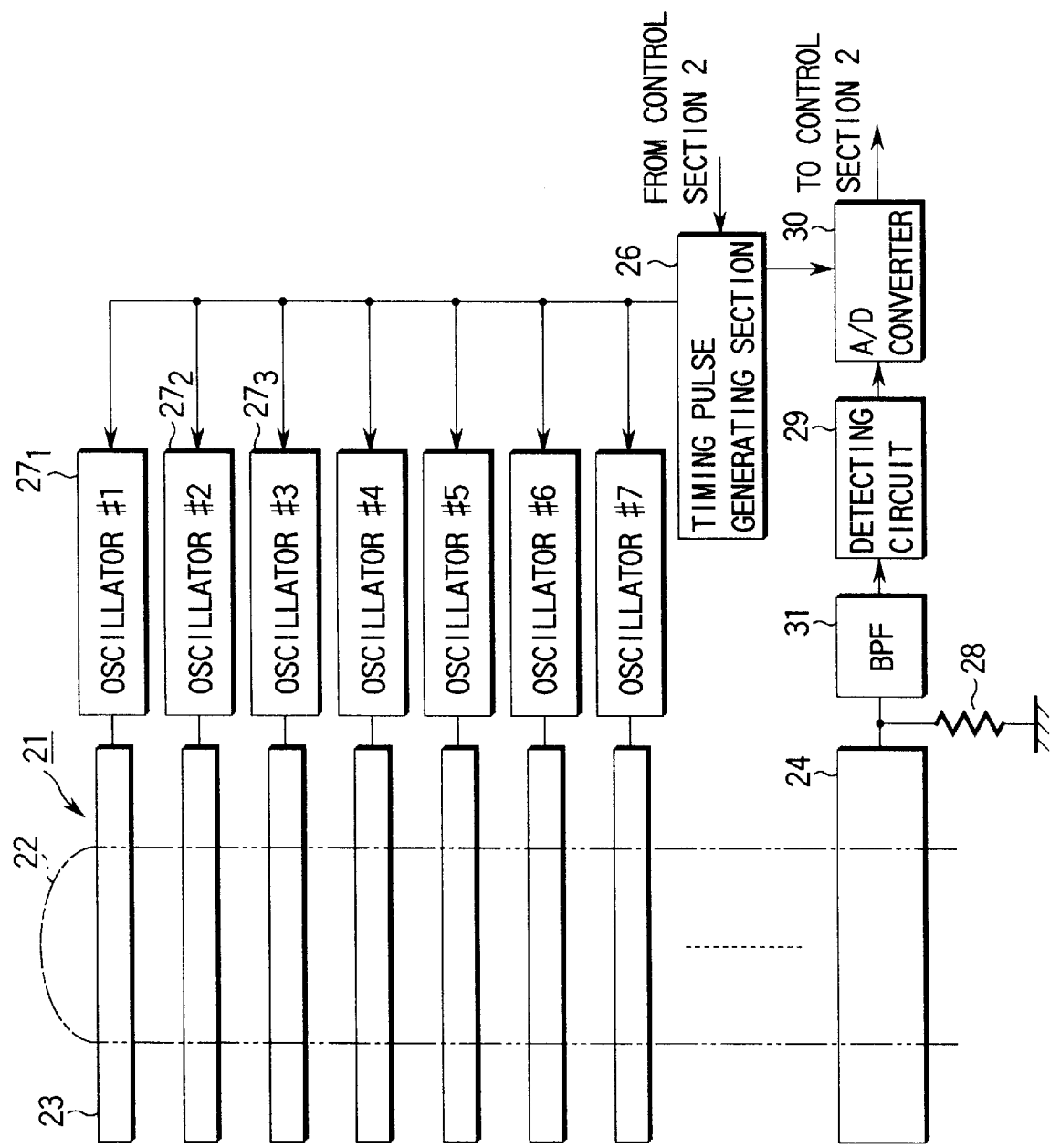
FIG. 19 is a schematic view, showing yet another structure of the pattern input section of FIG. 17.

FIG. 19 is a schematic view, showing a modification of the pattern input section shown in FIG. 6. In FIG. 19, elements similar to those shown in FIG. 6 are denoted by corresponding reference numerals, and duplicate description thereof will be avoided. As is shown in FIG. 19, the pattern input section has oscillators 27-1, 27-2, . . . which are connected to the output electrodes 23, respectively, and controlled to turn on and off by timing pulse signals output from the timing pulse generator 26.

The oscillation frequency of each of the oscillators 27-1, 27-2, . . . is predetermined, or is selected within a voluntary range or from predetermined frequencies supplied from the frequency variable oscillator shown in FIG. 7.

The input terminal 24 is grounded via the termination resistor 28, and a power supply (not shown) supply or the main body of the apparatus (both are not shown), and also connected to the input terminal of the detecting circuit 29 via the BPF 31 which will now be described with reference to FIG. 20.

Figure 20:
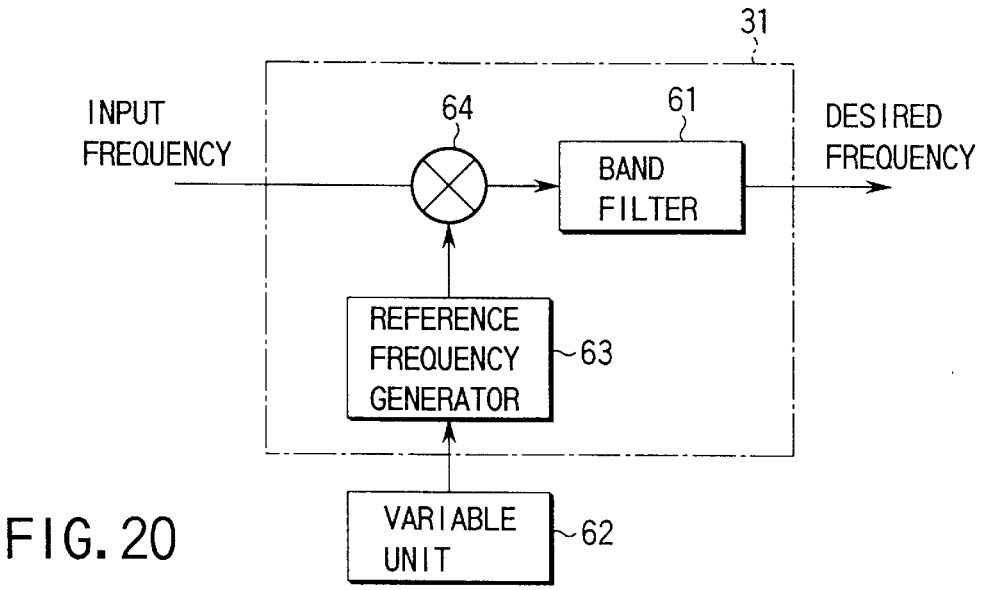
FIG. 20 is a schematic block diagram, showing an example of a band filter applicable to each of the pattern input sections of FIGS. 17 to 19.

FIG. 20 is a block diagram, showing an example of the BPF for used in the above-described various pattern input sections.

As is shown in FIG. 20, the BPF 31 includes a bandpass filter 61 for passing only signals of a predetermined frequency band, a reference frequency generator 63 for oscillating signals of a voluntary frequency or a number of preset frequencies, and a variable unit 62 and a frequency mixer 64 for creating voluntary or preset frequencies from the frequencies of the signals oscillated from the frequency oscillator 63. The frequency mixer 64 is provided to output a signal of a frequency equal to the difference between the oscillation frequency of the frequency oscillator and the input frequency, and functions as a bandpass filter 61 for a plurality of frequencies by setting the oscillation frequency of the reference frequency generator 63 at a predetermined value or a value falling within a voluntary range. Thus, the mixer enables pass of only a signal of a predetermined frequency band, thereby effectively eliminating undesired noise input from the outside, and providing a more stable projection signal.

Figure 21:
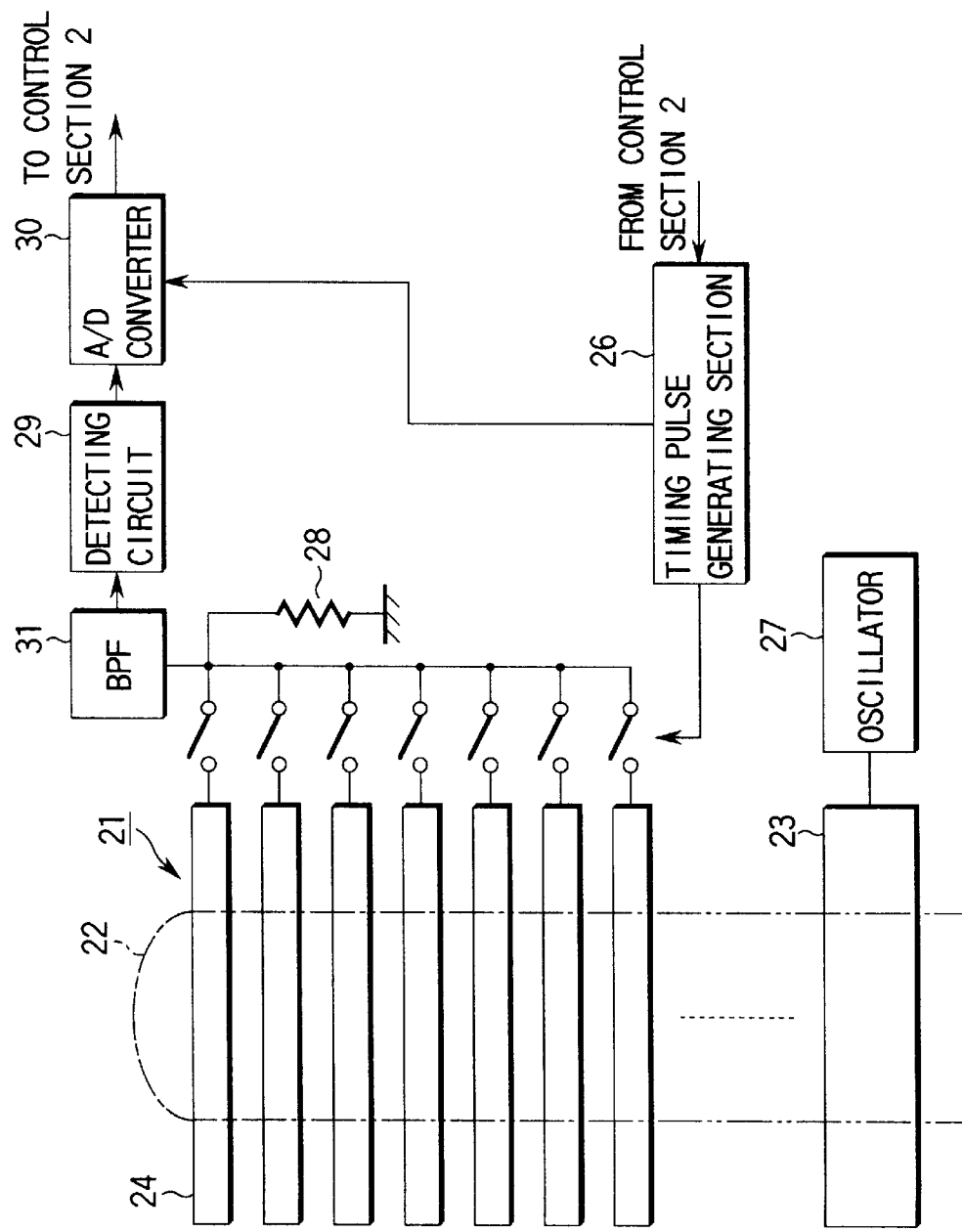
FIG. 21 is a block diagram, showing a structure of a pattern input section incorporated in an individual-identifying apparatus according to a sixth embodiment.

FIG. 21 is a schematic view, showing a modification of the pattern input section of FIG. 14.

In FIG. 21, the pattern input section has a linear electrode array 21 having a plurality of linear electrodes (input electrodes) 24 extending parallel to each other at regular intervals in a first direction, and a single output electrode 23 extending parallel to the input electrodes 24. A to-be-identified finger 22 of a to-be-identified person is put into contact with both the output and input electrodes 23 and 24.

More specifically, each input electrode 24 extends in a direction perpendicular to the longitudinal direction of the finger 22 of the to-be-identified person, and the portion of the finger 22 which extends from the tip to the second joint can be put into contact with the electrode 24.

The input electrodes 24 can be grounded via analog switches 25, a termination resistor 28 and a power supply (not shown) or the main body of the apparatus (not shown), and also can be connected to the input terminal of the detecting circuit 29 via the BPF 31 (see FIG. 20). The output of the detecting circuit 29 is converted to a digital signal by the A/D converter 30.

Figure 22:
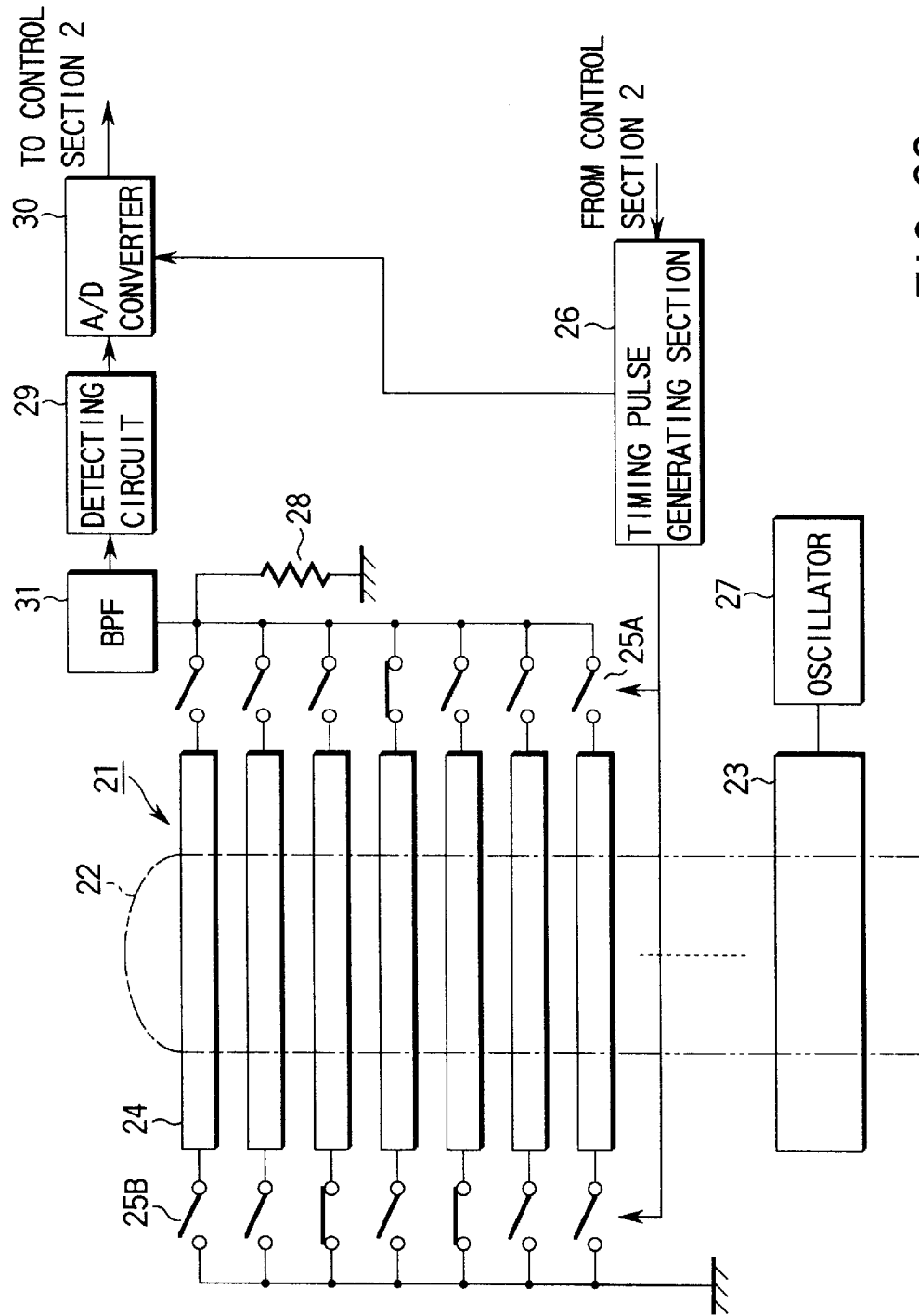
FIG. 22 is a schematic view, showing another structure of the pattern input section of FIG. 21.

FIG. 22 is a schematic view, showing a modification of the pattern input section of FIG. 15.

In FIG. 22, the pattern input section has a linear electrode array 21 having a predetermined number of linear input electrodes 24 extending parallel to each other with gaps of, for example, 1/10 mm, and a single output electrode 23 extending parallel to the input electrodes 24. A to-be-identified finger 22 of a to-be-identified person is put into contact with both the output and input electrodes 23 and 24.

More specifically, each input electrode 24 extends in a direction perpendicular to the longitudinal direction of the finger 22 of the to-be-identified person, and the portion of the finger 22 which extends from the tip to the second joint can be put into contact with the electrode 24.

Each input electrode 24 has an end to be connected to an end of a corresponding one of the first analog switches 25A, and the other end connected to an end of a corresponding one of second analog switches 25B. The other ends of the second analog switches 25B are grounded via a power supply (not shown) or the main body of the apparatus (not shown).

The output terminal of the oscillator 27 is connected to the output electrode 23. The oscillator 27 provides a predetermined frequency, or a voluntary frequency when it constitutes a frequency variable oscillator as shown in FIG. 7.

The input electrodes 24 can be grounded via the analog switches 25, the termination resistor 28 and a power supply (not shown) or the main body of the apparatus (not shown), and also can be connected to the input terminal of the detecting circuit 29 via the BPF 31. The output of the detecting circuit 29 is converted to a digital signal by the A/D converter 30.

Like the pattern input section 1 of FIG. 4, the pattern input section of FIG. 22 can provide a stable projection signal which is not influenced by the surface state of the finger. Further, when one of the switches of the group 25A is turned on, occurrence of an undesired noise component in the output electrode 23 connected to the turned-on switch can be avoided more effectively by grounding all the switches of the group 25B other than the switch connected to the output electrode 23 connected to the turned-on switch, as in the FIG. 5 case.

Figure 23:
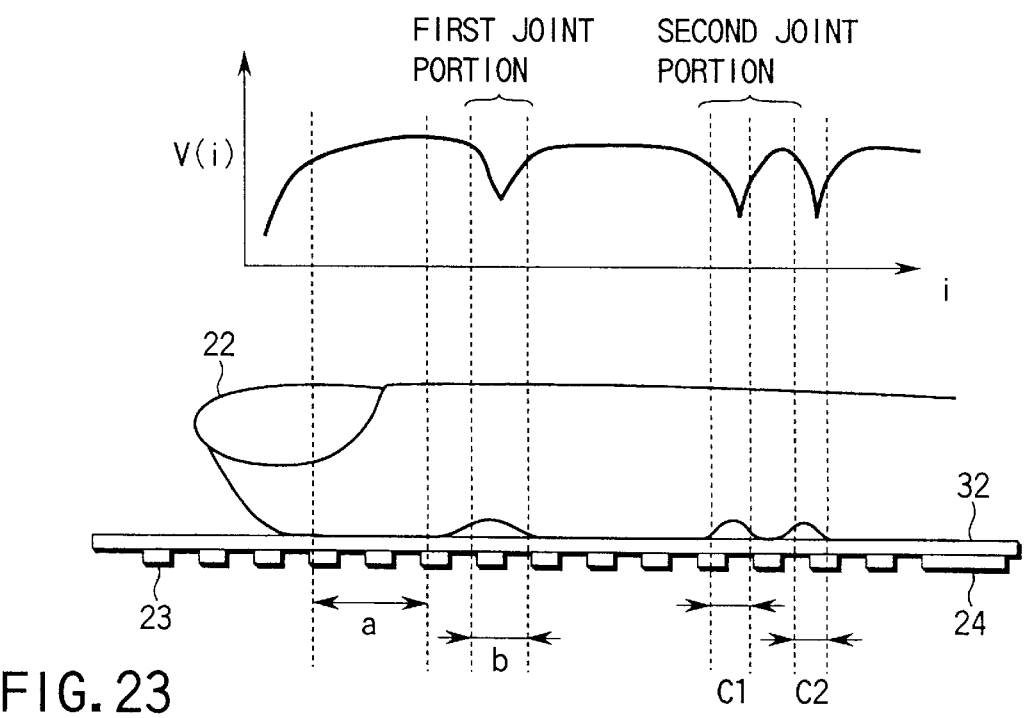
FIG. 23 is a schematic view, showing an example of a pattern input section, which is applicable to each pattern input section and can improve the output signal shown in FIG. 9.

FIG. 23 shows an output signal or projection signal V(i) and one side of a pattern input section which can reduce the range of variations in the level of the above-described projection signal V(i). This pattern input section is characterized in that all output and input electrodes 23 and 24 on which the finger 22 or 22a is to be placed are covered with an insulator 32 formed of, for example, a resin.

Since the output and input electrodes 23 and 24 are covered with the insulator 32, and hence the electrodes 23 and 24 and the finger 22 are connected only by electrostatic coupling (capacitive coupling), the contact resistance between the finger 22 and the electrodes 23 and 24 is infinite, which means that the electrodes are completely free from the influence of the surface state of the finger 22 (for example, free from whether or not the finger is damp), and therefore can provide a stable projection signal V(i).

Figure 24:
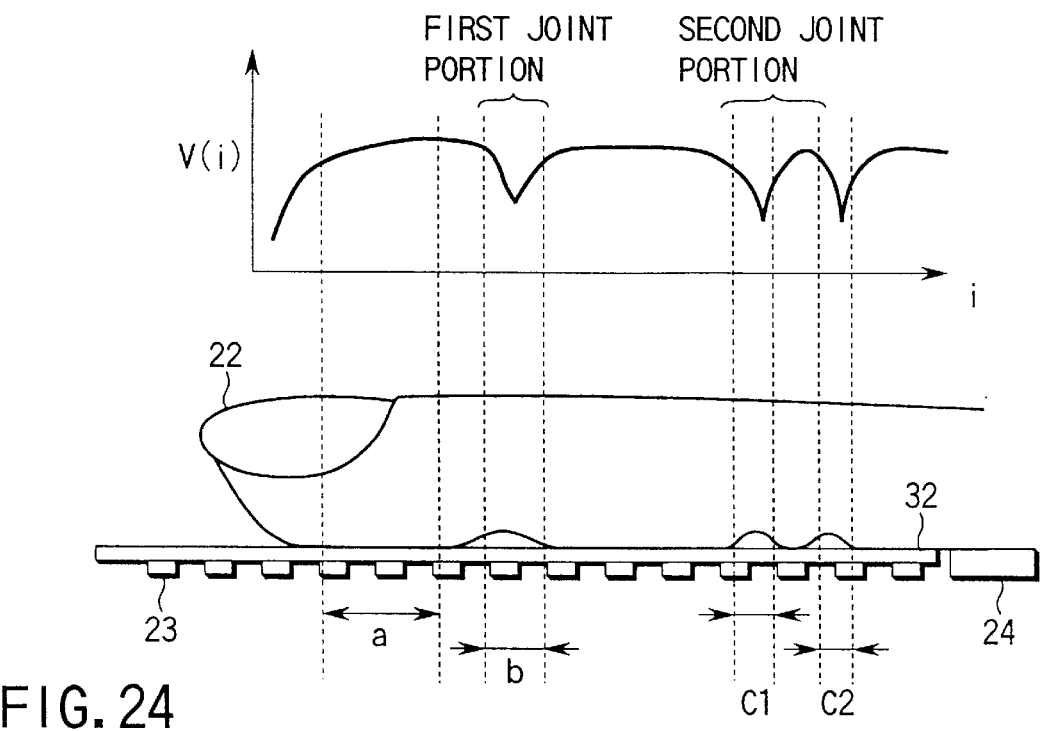
FIG. 24 is a schematic view, showing a modification of the pattern input section of FIG. 23.
Figure 25:
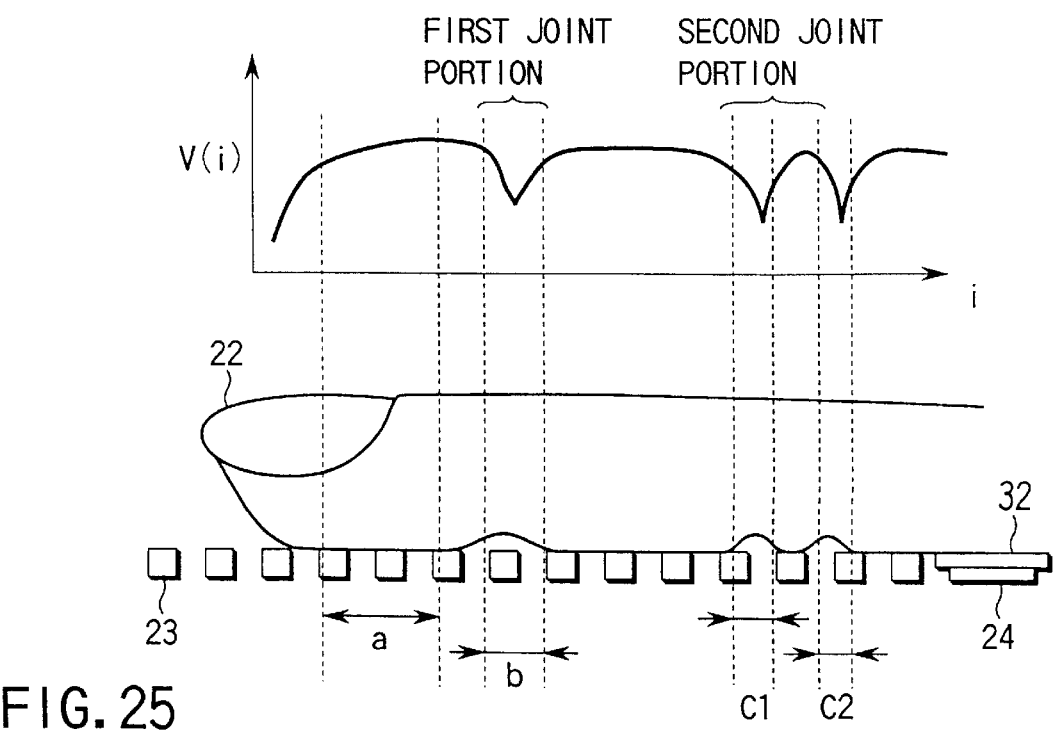
FIG. 25 is a schematic view, showing another modification of the pattern input section of FIG. 23.

FIGS. 24 and 25 are similar to FIG. 23. In those figures, an insulator 32 formed of, for example, a resin covers the output electrodes 23 or the input electrode 24 on which the finger 22 or 22a is placed.

Since in those cases, the insulator 32 covers the output electrodes 23 or the input electrode 24, and hence the electrodes 23 and 24 and the finger 22 are connected only by electrostatic coupling (capacitive coupling), the contact resistance between the finger 22 and the electrodes 23 and 24 is infinite, which means that the electrodes are completely free from the influence of the surface state of the finger 22 (for example, free from whether or not the finger is damp), and therefore can provide a stable projection signal V(i).

Modifications of the output and input electrodes of the pattern input section will now be described.

Figure 26:
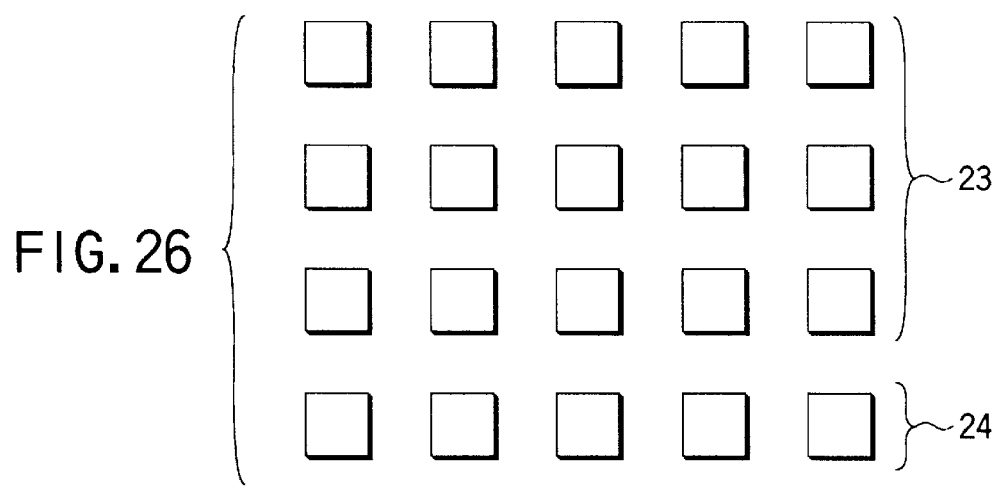
FIG. 26 is a schematic view, useful in explaining other examples of the output and input electrodes incorporated in the pattern input sections shown in most of the above figures.

A pattern input section shown in FIG. 26 has substantially square output electrodes 23 arranged with regular gaps in a matrix of, for example, 3×5, and a number (e.g. five) of substantially square input electrodes 24 linearly arranged with substantially the same gaps as the gaps of the output electrodes. The output electrodes 23 are to be connected to the analog switches 25 shown in FIG. 3.

In FIG. 26, a voluntary one of the output electrodes 23 can be connected to an oscillator 27 via a corresponding one of the analog switches 25, and the output of the voluntary output electrode is input to the input electrode 24.

The electrode arrangement of FIG. 26 can pick up, as an image, two-dimensional irregularity information such as the print of the finger 22.

Figure 27:
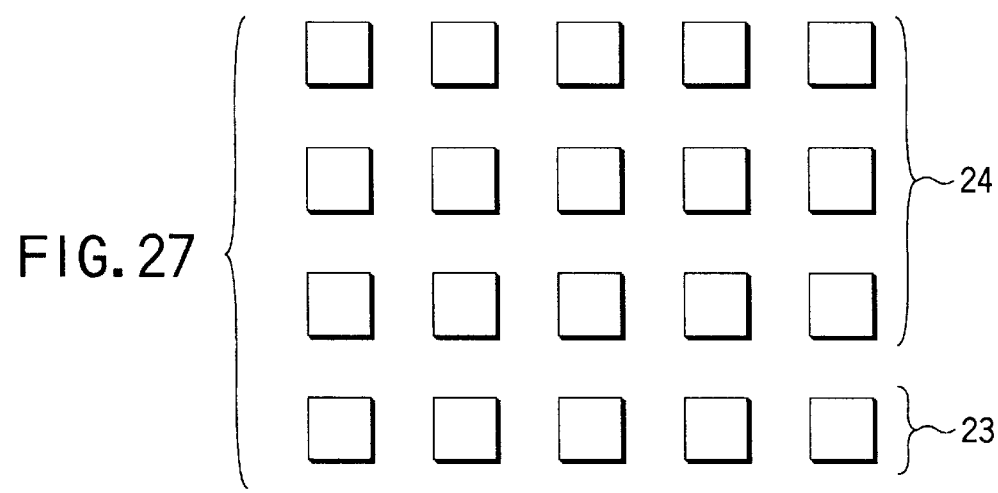
FIG. 27 is a schematic view, showing modifications of the output and input electrodes of FIG. 26.

FIG. 27 shows a case in which the arrangement of the input electrodes 24 and the output electrodes 23 in the pattern input section is reverse to that of FIG. 26. Specifically, the pattern input section shown has substantially square input electrodes 24 arranged with regular gaps in a matrix of 3×5, and five substantially square output electrodes 23 linearly arranged with substantially the same gaps as the gaps of the input electrodes. Each of the output electrodes 23 is connected to the oscillator 27 shown in FIG. 7, and a signal input to each input electrode 24 can be supplied to the phase detecting circuit 29 via a corresponding one of the switches 25.

Figure 28:
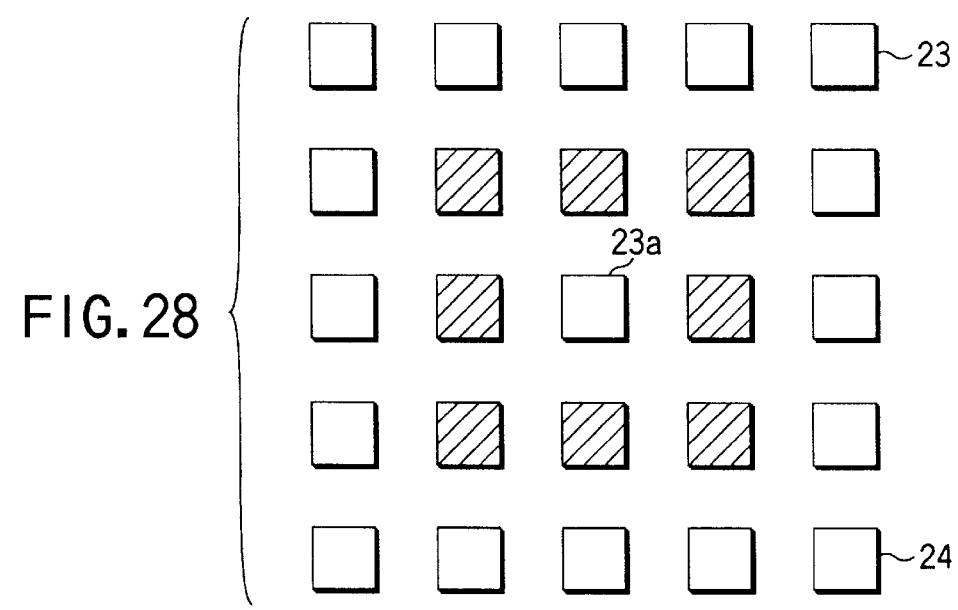
FIG. 28 is a schematic view, showing other modifications of the output and input electrodes of FIG. 26.

FIG. 28 shows a modification of the pattern input sections shown in FIGS. 26 and 27. This modification has output electrodes 23 arranged in a matrix of, for example, 4×5 with regular gaps, and a number (e.g. five) of input electrodes 24 linearly arranged with gaps substantially equal to the gaps of the output electrodes. Each of the output electrodes 23 is connected to corresponding ones of the first and second analog switches 25A and 25B shown in FIG. 4.

The pattern input section of FIG. 28 can be substantially free from the influence of undesired noise by connecting a voluntary one 23a of the electrodes 23 to the oscillator 27 via a corresponding one of the first analog switches 25A, and grounding those of the output electrodes 23 which surround the output electrode 23a via corresponding ones of the second analog switches 25B. The electrode arrangement of FIG. 28 enables pick-up, as an image, of two-dimensional irregularity information such as the print of the finger 22.

Figure 29:
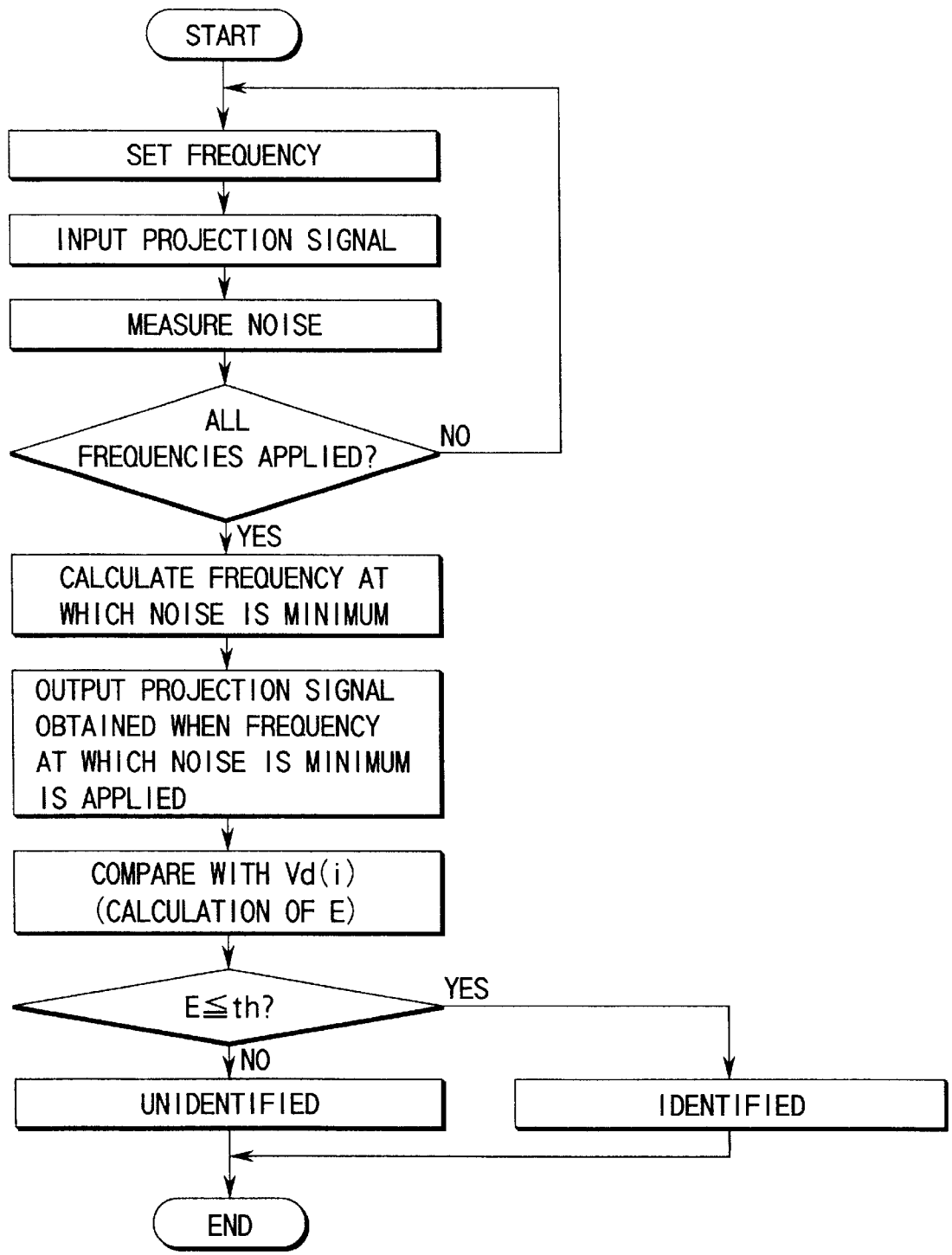
FIG. 29 is a flowchart, useful in explaining a procedure for extracting, from each of the above pattern input sections, finger irregularity information using plural frequencies generated by plural frequency generator shown in FIG. 7, and identifying a to-be-identified person by the identifying apparatus of FIG. 1.

FIG. 29 is a flowchart, useful in explaining identification performed by the identifying apparatus of FIG. 1 when signals of different frequencies output from the frequency variable oscillator 27 shown in FIG. 7 are sequentially applied to each of the above-described various pattern input sections 1, in particular, to the output or input electrodes 23 or 24.

As is shown in FIG. 29, first, the frequency of a signal oscillated from the oscillator 27 is set. Subsequently, signals V(i) indicative of various portions of the to-be-identified finger are sequentially measured at the signal processing time points explained with reference to FIG. 8.

Thereafter, only a noise component is measured by, for example, measuring a projection signal obtained when the finger is put into contact only with the input electrode 24. Moreover, the level of noise mixed into each projection signal due to the finger can be measured by calculating the average level of the projection signals. In addition, noise can be also extracted by measuring the projection signals, with the finger kept in contact with both the output and input electrodes as in the usual projection signal measurement, and with the oscillator 27 kept off.

The above-described detection of projection signals and measurement of noise is repeated for all oscillation frequencies which the oscillator 27 can provide.

Thus, the oscillation frequency at which minimum noise is measured is detected, and V(i) outputs, i.e. projection signals, as shown in FIG. 9 is obtained from signals V(i) measured at the oscillation frequency.

Figure 11:
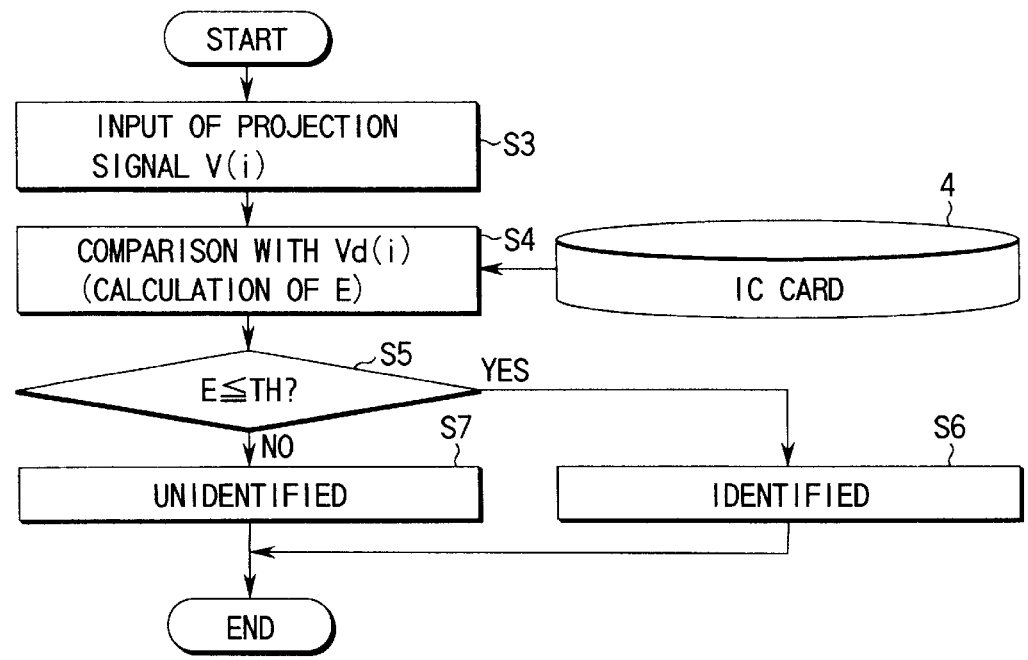
FIG. 11 is a flowchart, useful in explaining an identification process performed in the individual-identifying apparatus of FIG. 1.

Then, the degree-of-difference E explained referring to FIG. 11 and the formulas (2) to (5) is obtained and compared with a predetermined threshold level TH. If, as described above, $E \leq TH$, the to-be-identified person is identified.

Figure 30:
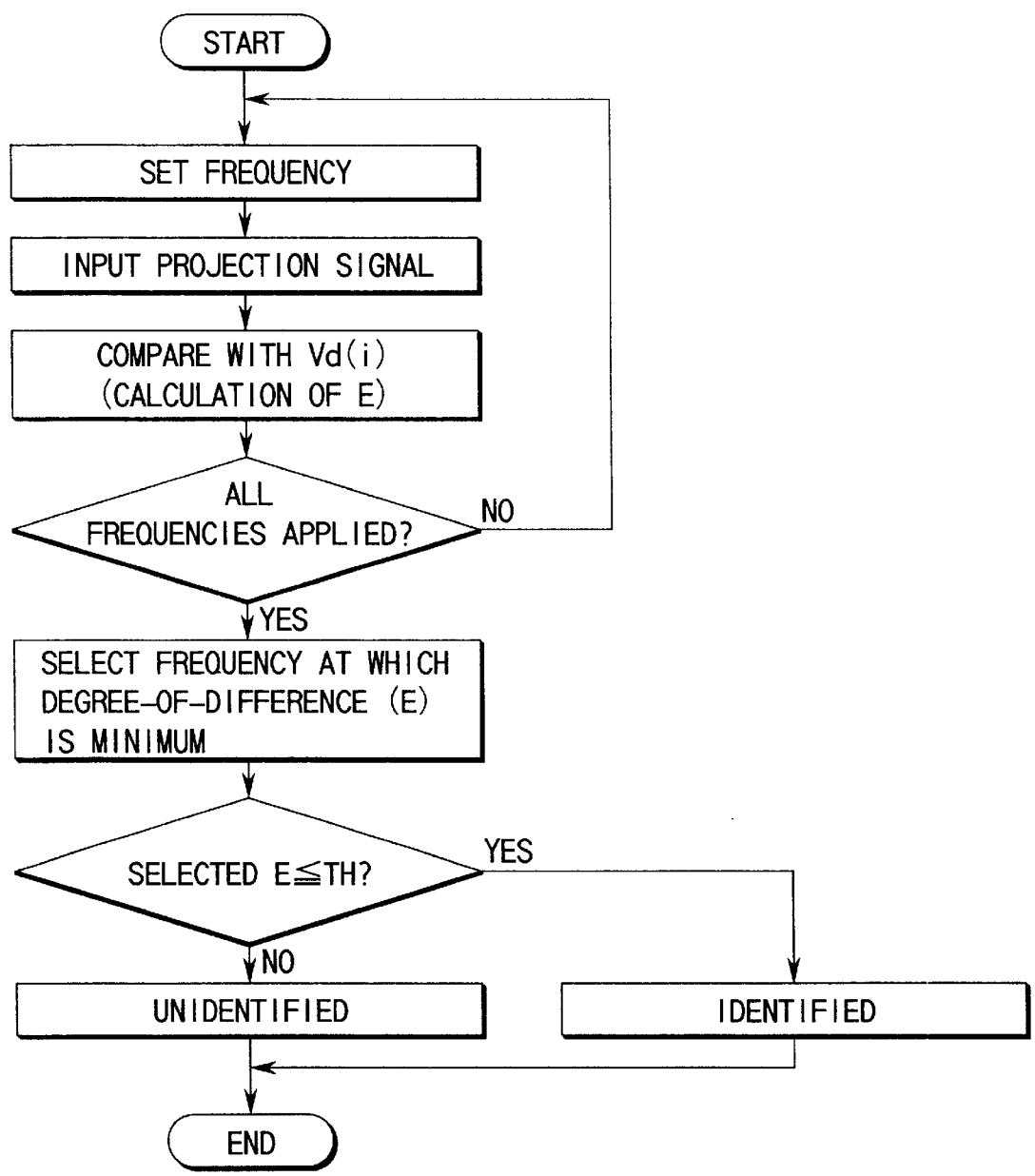
FIG. 30 is a flowchart, useful in explaining a procedure different from that of FIG. 29.

FIG. 30 is a flowchart, useful in explaining the manner of identification different from that illustrated in FIG. 20.

As is shown in FIG. 30, first, the frequency of a signal oscillated from the oscillator 27 is set. Subsequently, signals V(i) indicative of various portions of the to-be-identified finger are sequentially measured.

Then, the degree-of-difference E explained referring to FIG. 11 and the formulas (2) to (5) is obtained, and the above-described detection of projection signals and calculation of the degree-of-difference E is repeated for all oscillation frequencies which the oscillator 27 can provide.

As a result, the frequency at which the calculated degree-of-frequency E is minimum is obtained and compared with a predetermined threshold level TH. If, as described above, $E \leq TH$, the to-be-identified person is identified.

Figure 31:
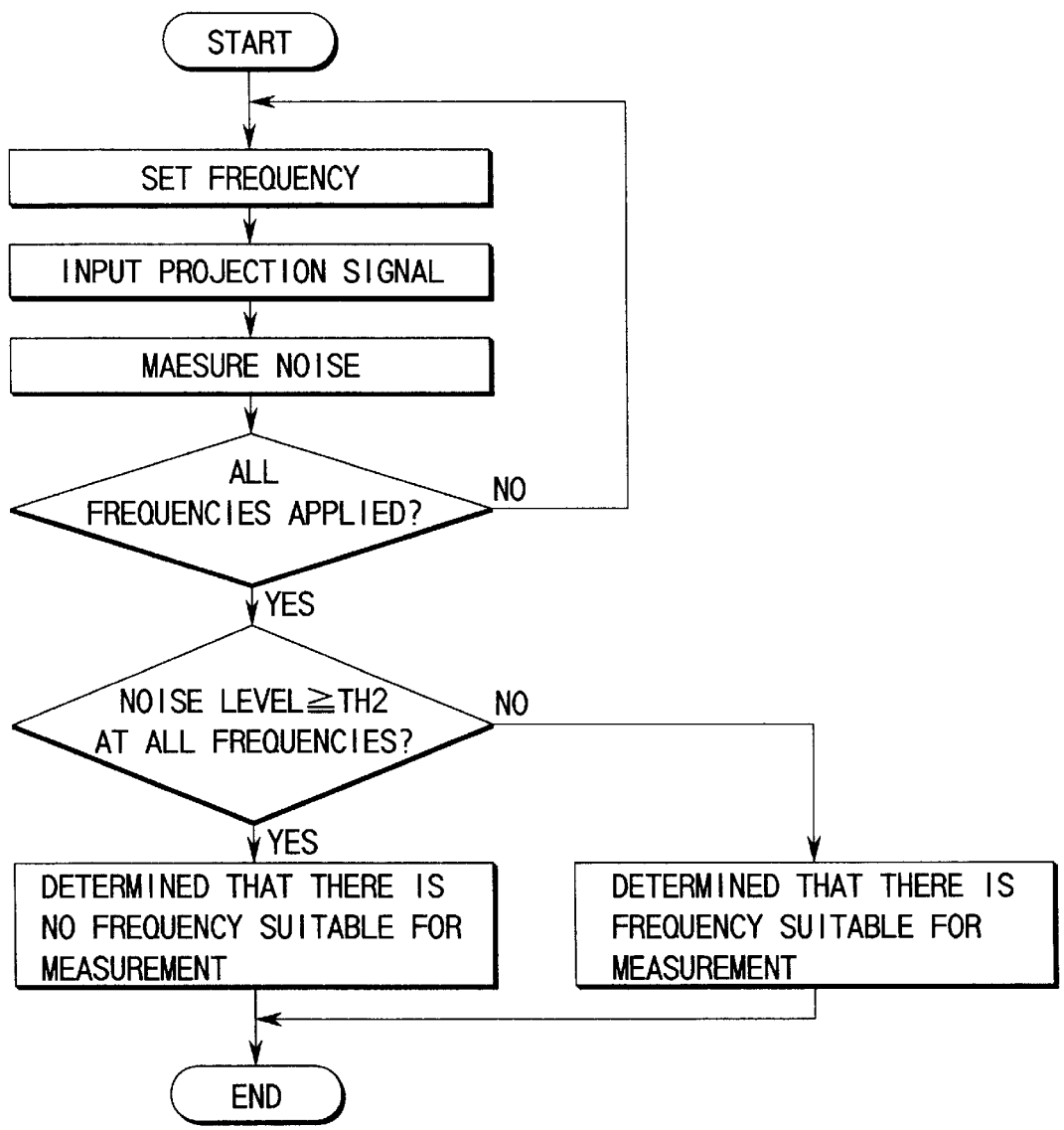
FIG. 31 is a flowchart, useful in explaining a procedure for specifying measurement enabling conditions of the plural frequencies used to identify a to-be-identified person.

FIG. 31 is a flowchart, useful in explaining conditions suitable for measurement used to identify the to-be-identified person.

As is shown in FIG. 31, first, the frequency of a signal oscillated from the oscillator 27 is set. Subsequently, signals V(i) indicative of various portions of the to-be-identified finger are sequentially measured.

Subsequently, only noise is measured by, for example, measuring a projection signal obtained when the finger is put into contact only with the input electrode.

Then, the detection of the projection signals and measurement of noise is repeated for all oscillation frequencies which the oscillator 27 can provide.

Thereafter, it is determined for all oscillation frequencies whether or not the level of noise exceeds a predetermined threshold level TH2. If it is determined that the measured noise level $\geq$ TH2, the measurement is temporarily stopped or all process steps are repeated from the beginning.

If in the process shown in FIG. 31, the noise level exceeds a predetermined value, it is useful, in order to increase the accuracy of identification, to temporarily stop the measurement of the projection signal V(i) so as to reduce the influence of outside noise which usually exists around the individual-identifying apparatus. Since the outside noise level varies every moment, appropriate projection signals V(i) can be obtained in many cases when all the process steps are repeated again.

Figure 32:
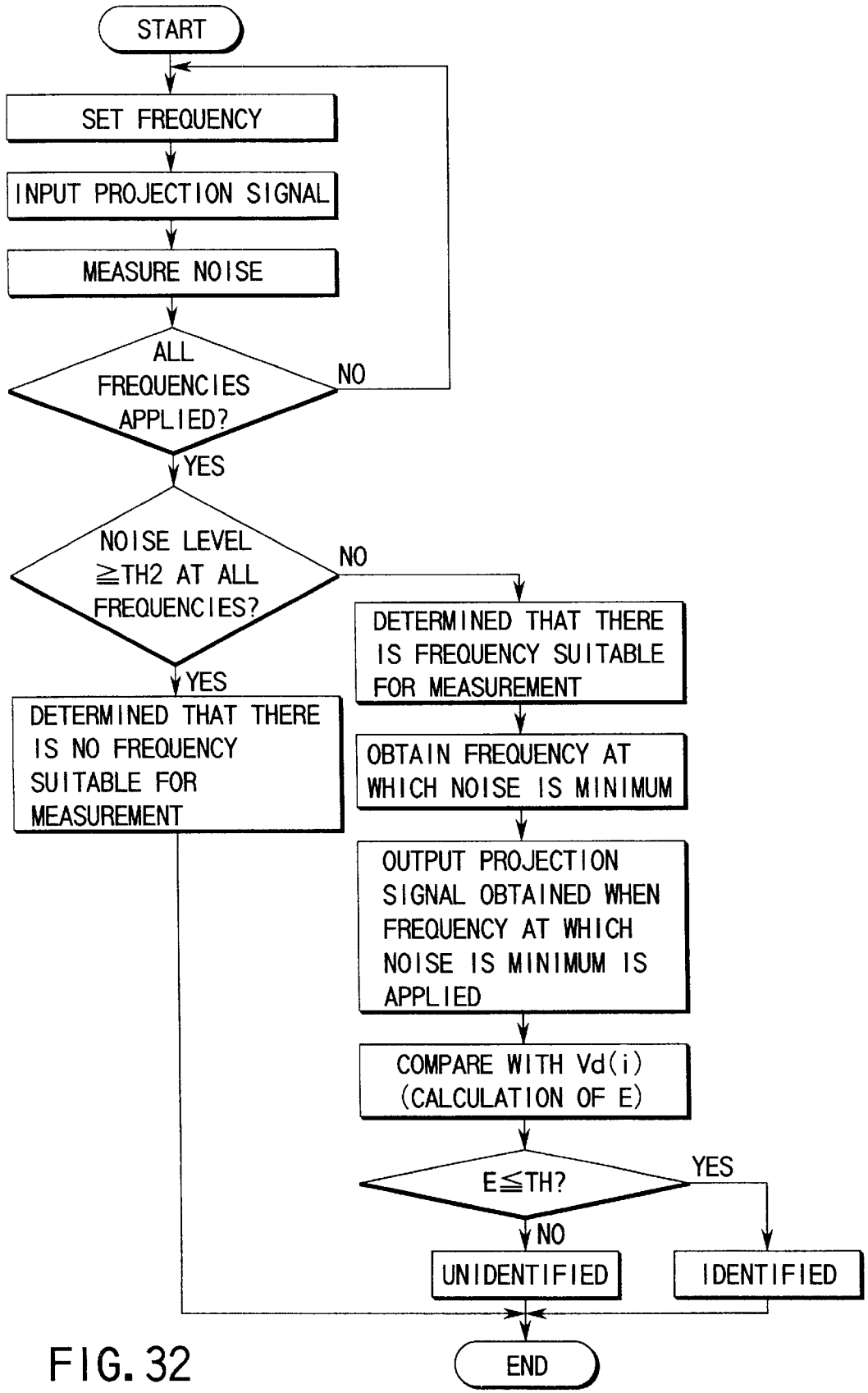
FIG. 32 is a flowchart, useful in explaining another procedure different from that of FIG. 29.

FIG. 32 is a flowchart, useful in explaining the manner of identification different from that illustrated in FIG. 29.

In the flowchart of FIG. 32, first, the frequency of a signal oscillated from the oscillator 27 is set. Subsequently, signals V(i) indicative of various portions of the to-be-identified finger are sequentially measured at the signal processing time points explained with reference to FIG. 7.

Then, only a noise component is measured by, for example, measuring a projection signal obtained when the finger is put into contact only with the input electrode 24.

Subsequently, the detection of projection signals and measurement of noise is repeated for all oscillation frequencies which the oscillator 27 can provide.

Thereafter, it is determined for all oscillation frequencies whether or not the level of noise exceeds a predetermined threshold level TH2. If it is determined that the measured noise level $\geq$ TH2, the measurement is temporarily stopped or all process steps are repeated from the beginning.

If the measured noise level $\leq$ TH2, the oscillation frequency at which the measured noise level is minimum is obtained, and V(i) outputs, i.e. projection signals, as shown in FIG. 9 is obtained from signals V(i) measured at the oscillation frequency.

Then, the degree-of-difference E explained referring to FIG. 11 and the formulas (2) to (5) is calculated and compared with a predetermined threshold level TH. If, as described above, $E \leq TH$, the to-be-identified person is identified.

As described above, the invention can provide a finger irregularity information input apparatus and an individual-identifying apparatus, capable of accurately detecting information on, for example, wrinkles of the finger surface of a to-be-identified person, thereby accurately identifying the person.

Further, the impedance due to the capacitive coupling between the finger and the electrodes enables information indicative of the irregularity of the finger to be obtained, which means that an accurate state-indicating signal can be detected even when the finger surface state varies, typically perspiration on the finger.

Moreover, in the invention, a plurality of oscillation frequencies are used to obtain the finger irregularity information, and the degree-of-difference is calculated from an output signal with lowest noise level to identify a to-be-identified person. Therefore, accurate individual identification can be performed.

Furthermore, covering electrodes with an insulating thin film enables detection of more stable irregularity information which is free from the influence of the finger surface state.

In addition, while switches of the first analog switch group are sequentially turned on, those switches of the second analog switch group, which are connected to the output electrodes located adjacent to the output electrode connected to a turned-on one of the switches, are grounded, thereby guiding the output signal to the input electrode and preventing the influence of an undesired noise component.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A finger irregularity information input apparatus comprising:

a plurality of output electrodes arranged at regular intervals in a direction perpendicular to a longitudinal direction of a to-be-measured finger of a to-be-identified person, the finger having its irregularity measured, the output electrodes being brought into contact with the finger;

in oscillator for outputting a signal of a predetermined frequency to each of the output electrodes;

a switching unit for sequentially connecting the output terminal of the oscillator to each of the output electrodes;

wherein when the oscillator supplies an output to one of the output electrodes, the switching unit grounds those of the output electrodes which are adjacent to the output electrode to be connected to the oscillator;

an input electrode extending at an end along the direction in which the output electrodes are arranged, the input electrode being brought into contact with the finger; and a detecting device for detecting a capacitive coupling signal generated between the finger and the input electrode.

2. An apparatus according to claim 1, wherein the oscillator can output signals of different frequencies.

3. An apparatus according to claim 2, further comprising a bandpass filter for passing only that one of signals input to the input electrode, which has a voluntary frequency and is output from the oscillator.

4. An apparatus according to claim 1, further comprising a bandpass filter for passing only that one of signals input to the input electrode, which has a predetermined frequency.

5. A finger irregularity information input apparatus comprising:

an output electrode to be brought into contact with a voluntary portion of a to-be-measured finger of a to-be-identified person;

an oscillator for outputting a signal of a predetermined frequency to the output electrode;

a plurality of input electrodes arranged at regular intervals in a direction perpendicular to a longitudinal direction of the finger, the input electrodes being brought into contact with the finger at a same time the finger is put into contact with the output electrode;

a switching unit for permitting the input electrodes to sequentially input current induced through the finger to which the signal is applied from the output electrode; and a detecting device for detecting a capacitive coupling signal generated between the finger and each of the input electrodes taken via the switching unit from each of the input electrodes, to thereby generate a predetermined output signal;

wherein when the oscillator supplies an output to the output electrode, the switching unit grounds those of the input electrodes which are adjacent to the input electrode to be connected to the detecting device.

6. An apparatus according to claim 5, wherein the oscillator can output signals of different frequencies.

7. An apparatus according to claim 6, further comprising a bandpass filter for passing only that one of signals input to the input electrode, which has a voluntary frequency and is output from the oscillator.

8. An apparatus according to claim 5, further comprising a bandpass filter for passing only that one of signals input to the input electrode, which has a predetermined frequency.

9. An individual-identifying apparatus comprising:

a storage device for storing feature information for identification concerning a to-be-measured finger of a to-be-identified person;

a finger irregularity information input apparatus including:

a plurality of output electrodes arranged at regular intervals in a direction perpendicular to a longitudinal direction of a to-be-measured finger of a to-be-identified person, the finger having its irregularity measured, the output electrodes being brought into contact with the finger;

an oscillator for outputting a signal of a predetermined frequency to each of the output electrodes;

a switching unit for sequentially connecting the output terminal of the oscillator to the output electrodes;

an input electrode extending at an end along the direction in which the output electrodes are arranged, the input electrode being brought into contact with the finger;

and a phase detecting device for processing a signal output from the input electrode to thereby generate a predetermined output signal;

wherein when the oscillator supplies an output to one of the output electrodes, the switching unit grounds those of the output electrodes which are adjacent to the output electrode to be connected to the oscillator; and a comparing device for comparing feature information obtained from the phase detecting device of the finger irregularity input apparatus, with the feature information stored in the storage device, in order to identify the to-be-identified person.

10. An individual-identifying apparatus comprising:

a storage device for storing feature information for identification concerning a to-be-measured finger of a to-be-identified person;

a finger irregularity information input apparatus including:

an output electrode to be brought into contact with a voluntary portion of a to-be-measured finger of a to-be-identified person;

an oscillator for outputting a signal of a predetermined frequency to the output electrode;

a plurality of input electrodes arranged at regular intervals in a direction perpendicular to a longitudinal direction of the finger, the input electrodes being brought into contact with the finger at the same time when the finger is put into contact with the output electrode;

a switching unit for enabling the input electrodes to sequentially inputting current induced through the finger to which the signal is applied from the output electrode; and a phase detecting device for processing a signal taken via the switching unit from each of the input electrodes, to thereby generate a predetermined output signal;

wherein when the oscillator supplies an output to the output electrode, the switching unit grounds those of the input electrodes which are adjacent to the input electrode to be connected to the phase detecting device; and a comparing device for comparing feature information obtained from the phase detecting device of the finger irregularity input apparatus, with the feature information stored in the storage device, in order to identify the to-be-identified person.

\* \* \* \* \*